United States Patent
Lee et al.

(10) Patent No.: US 7,430,320 B2
(45) Date of Patent: Sep. 30, 2008

(54) REGION-GUIDED BOUNDARY REFINEMENT METHOD

(75) Inventors: Shih-Jong J. Lee, Bellevue, WA (US); Tuan Phan, Lynnwood, WA (US)

(73) Assignee: DRVision Technologies LLC, Bellevue, WA (US)

( * ) Notice: Subject to any disclaimer, the term of this patent is extended or adjusted under 35 U.S.C. 154(b) by 936 days.

(21) Appl. No.: 10/998,282

(22) Filed: Nov. 15, 2004

(65) Prior Publication Data
US 2006/0104516 A1 May 18, 2006

(51) Int. Cl.
*G06K 9/34* (2006.01)

(52) U.S. Cl. .................. 382/173; 382/199; 382/266

(58) Field of Classification Search ............... 382/173, 382/133, 128, 190, 199, 213, 257, 283, 266; 250/458.1, 461.1; 600/317; 345/629
See application file for complete search history.

(56) References Cited

U.S. PATENT DOCUMENTS

| | | | |
|---|---|---|---|
| 5,867,610 A | 2/1999 | Lee | |
| 6,463,175 B1 | 10/2002 | Lee | |
| 7,136,518 B2 * | 11/2006 | Griffin et al. | 382/133 |
| 7,282,723 B2 * | 10/2007 | Schomacker et al. | 250/458.1 |
| 7,309,867 B2 * | 12/2007 | Costa et al. | 250/458.1 |
| 2004/0202368 A1 | 10/2004 | Lee | |

FOREIGN PATENT DOCUMENTS

WO  WO 03009579 A2 *  1/2003

OTHER PUBLICATIONS

U.S. Appl. No. 10/767,530, filed Jan. 2004, Lee; Phan.
Xiao-Ping Zhang and Mita D. Desai, Wavelet Based Automatic Thresholding for Image Segmentation, In Proc. of ICIP'97, Santa Barbara, CA, Oct. 26-29, 1997.
S Wu and Amin, Automatic Thresholding of Gray-level Using Multi-stage Approach, proceed. of the 7th International Conference onDocument Analysis and Recognition (ICDAR) 2003.
Wilkinson, Gijs de Vries, Westenberg, Blood Vessel Segmentation Using Moving-WindowRobust Automatic Threshold Selection, IEEE Intern. Conf. on Image Processing Sep. 2003.

(Continued)

*Primary Examiner*—Anh Hong Do

(57) ABSTRACT

A region-guided boundary refinement method for object segmentation in digital images receives an initial object regions of interest and performs directional boundary decomposition using the initial object regions of interest to generate a plurality of directional object boundaries output. A directional border search is performed using the plurality of directional object boundaries to generate base border points output. A base border integration is performed using the base border points to generate base borders output. In addition, a boundary completion is performed using the base borders having boundary refined object regions of interest output.

A region-guided boundary completion method for object segmentation in digital images receives an initial object regions of interest and base borders. It performs boundary completion using the initial object regions of interest and the base borders to generate boundary refined object regions of interest output. The boundary completion method performs border growing using the base borders to generate grown borders output. A region guided connection is performed using the grown borders to generate connected borders output. A region guided merging is performed using the connected borders to generate fined object regions of interest output.

26 Claims, 21 Drawing Sheets

OTHER PUBLICATIONS

Yitzhaky and Peli, A Method for Objective Edge Detection Evaluation and Detector Parameter Selection, IEEE Trans. on Pami vol. 25, No. 8, pp. 1027-1033, Aug. 2003.

Luck, Bovik, Richards-Kortum, Segmenting Cervical Epithelial Nuclei From Confocal Images Using Gaussian Markov Random Fields, IEEE Intern. Conf. on Image Processing Sep. 2003.

Leung, Chen, Kwok, and Chan, Brain Tumor Boundary Detection in MR Image with Generalized Fuzzy Operator, IEEE Intern. Conf. on Image Processing Sep. 2003.

Pascal Bamford, Empirical Comparison of Cell Segmentation Algorithms Using an Annotated Dataset, IEEE Intern. Conf. on Image Processing Sep. 2003.

* cited by examiner

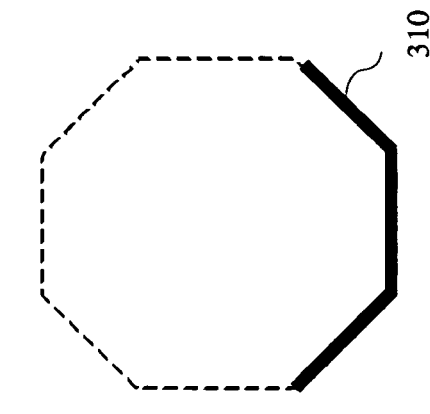
Figure 3C
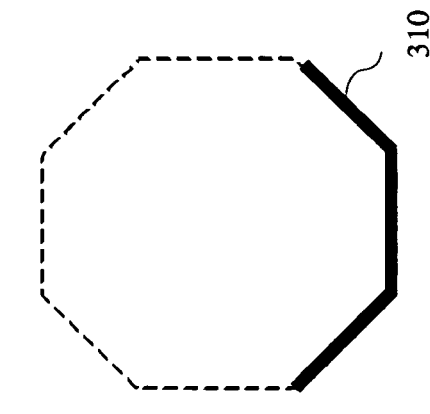
Figure 3F
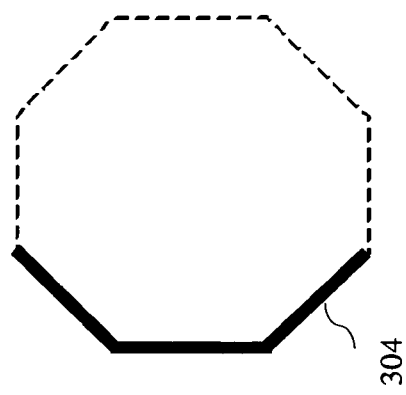
Figure 3B
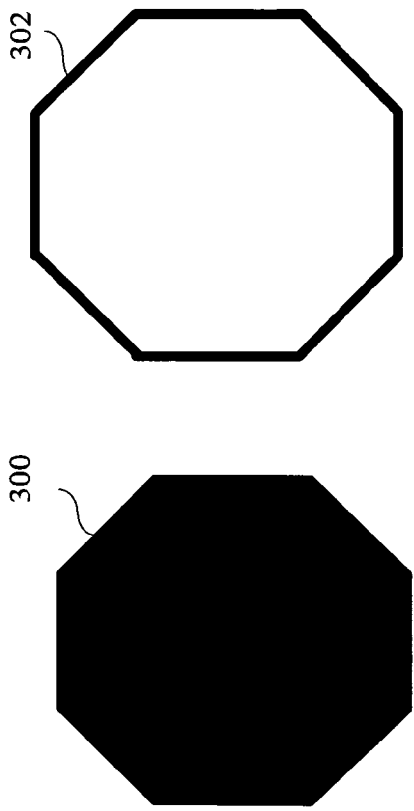
Figure 3E
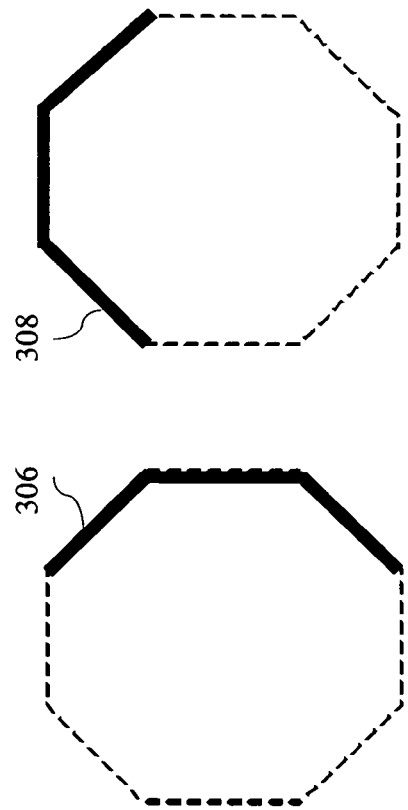
Figure 3A
Figure 3D

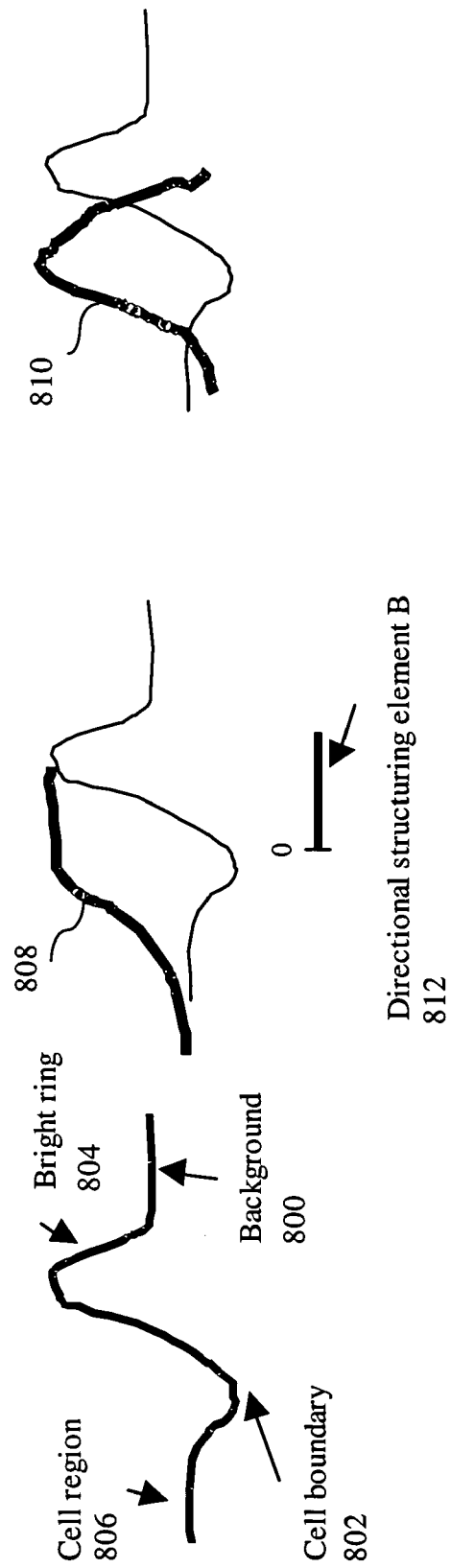

REGION-GUIDED BOUNDARY REFINEMENT METHOD

TECHNICAL FIELD

This invention relates to the enhanced segmentation of digital images containing objects of interest to determine the regions in the images corresponding to those objects of interest.

BACKGROUND OF THE INVENTION

Image object segmentation processes digital images containing objects of interest and determines the regions in the images corresponding to those objects of interest. Image object segmentation is critical for many applications such as the detection of the coronary border in angiograms, multiple sclerosis lesion quantification, surgery simulations, surgical planning, measuring tumor volume and its response to therapy, functional mapping, automated classification of blood cells, studying brain development, detection of microcalcifications on mammograms, image registration, atlas-matching, heart image extraction from cardiac cineangiograms, detection of tumors, cell high content screening, automatic cancer cell detection, semiconductor wafer inspection, circuit board inspection and alignment etc. Image object segmentation is the basis to follow on object based processing such as measurement, analysis and classification. Therefore, good object segmentation is highly important. If segmented object regions are incorrect. The measurements performed on the segmented objects will certainly be incorrect and therefore any analysis and conclusion drawn based on the incorrect measurements will be erroneous and compromised.

It is difficult to specify what constitutes an object of interest in an image and define the specific segmentation procedures. General segmentation procedures tend to obey the following rules:

Regions of object segmentation should be uniform and homogeneous with respect to some characteristics, such as gray level or texture.

Region interiors should be simple and without many small holes.

Adjacent regions of different objects should have significantly different values with respect to the characteristic on which they are uniform.

Boundaries of each segment should be simple, not ragged, and must be spatially accurate.

However, enforcing the above rules is difficult because strictly uniform and homogeneous regions are typically full of small holes and have ragged boundaries. Insisting that adjacent regions have large differences in values could cause regions to merge and boundaries to be lost. Therefore, it is not possible to create a universal object segmentation method that will work on all types of objects.

Prior art segmentation methods are performed in a primitive and ad-hoc fashion on almost all image processing systems. For simple applications, image thresholding is the standard method for object segmentation. This works on images containing bright objects against dark background or dark objects against bright background such as man made parts in machine vision applications. In this case, the object segmentation methods amount to determining a suitable threshold value to separate objects from background (Xiao-Ping Zhang and Mita D. Desai, Wavelet Based Automatic Thresholding for Image Segmentation, In Proc. of ICIP '97, Santa Barbara, Calif., Oct. 26-29, 1997; Sue Wu and Adnan Amin, Automatic Thresholding of Gray-level Using Multi-stage Approach, proceedings of the Seventh International Conference on Document Analysis and Recognition (ICDAR 2003); Michael H. F. Wilkinson, Tsjipke Wijbenga, Gijs de Vries, and Michel A. Westenberg, BLOOD VESSEL SEGMENTATION USING MOVING-WINDOW ROBUST AUTOMATIC THRESHOLD SELECTION, IEEE International Conference on Image Processing, September 2003.). For images with multiple object types with high object boundary contrast, edge detection methods are often used for object segmentation. (Yitzhak Yitzhaky and Eli Peli, A Method for Objective Edge Detection Evaluation and Detector Parameter Selection, IEEE TRANSACTIONS ON PATTERN ANALYSIS AND MACHINE INTELLIGENCE, VOL. 25, NO. 8, PP. 1027-1033, AUGUST 2003.

Application specific object segmentation methods were developed for complicated yet well-defined and high volume applications such as blood cell counting, Pap smear screening, and semiconductor inspection. Human with image processing expertise through extensive programming and trial and error process that involves not only object segmentation module but also optics, illumination, and image acquisition process adjustments developed the application specific object segmentation methods. For complicated yet not well-defined or low volume applications, automatic segmentation method doe not exist. In these applications, object segmentation is often performed by human manually or uses a combination of human and computer interaction.

As an example, prior art cell and tissue segmentation methods are based on simple thresholding followed by rudimentary measurements (Cellomics/ArrayScan, Molecular Devices/Discovery 1, Amersham/IN CELL Analyzer 3000, Atto Biosciences/Pathway HT, Q3DM/EIDAQ 100-HTM). The cell and tissue segmentation results are therefore highly dependent on the ability of the specimen preparation and staining process to create simple, well defined objects of interest that have minimum overlaps. In this case, the cells can be easily segmented by thresholding on simple color or intensity values. They are therefore limited to standard assays and are non-robust and inflexible for changes. This is the state-of-art and the foundation of the current computer cell analysis system.

Cell and tissue high content/context screening assays have the potential to take pivotal role in the drug discovery process in the post-genomic era. High content/context screening assays provide large amounts of biological and chemical information that could help researchers discover the most effective drugs more efficiently, while getting flawed compounds to "fail fast," thus saving considerable time and expense. Live cell high context screening assays can be used across nearly all stages of the drug discovery and development process, including target identification and validation, lead selection and optimization, and preclinical studies. However, in the live cell assay, in order to maintain the cell nature environment for meaningful studies there is limited control over the staining quality and cell configuration arrangement. The cells could be highly overlapped and live in aggregates. This represents a formidable challenge for fully automatic cell segmentation.

More sophisticated object segmentation methods are disclosed in Brette L. Luck1, Alan C. Bovik1, Rebecca R. Richards-Kortum, SEGMENTING CERVICAL EPITHELIAL NUCLEI FROM CONFOCAL IMAGES USING GAUSSIAN MARKOV RANDOM FIELDS, IEEE International Conference on Image Processing, September 2003.", "Lee, Shih-Jong, U.S. Pat. No. 5,867,610, Method for identifying objects using data processing techniques" and "Lee, Shih-Jong, Oh, Seho, U.S. patent application Ser. No. 10/410,063, Learnable Object Segmentation", which is incorporated in its entirety herein. However, these more sophisticated object segmentation methods and the thresholding based methods are mostly region based that applies a threshold on some image characteristics. The threshold could be a global one that is either fixed or dynamically determined from the histogram of the image characteristics. The threshold could also be a local one where the values are different for different pixel locations. The underlying assumption of the thresholding approach is that the regions of object should be uniform and homogeneous with respect to the image characteristics of interest. This approach could sufficiently detects significant portions of the object regions. However, the resulting object regions are often not accurate. This is especially the case for the boundaries of the objects. This is because the object region characteristics of interest often are different when close to the boundary of the objects. Therefore, boundaries of an object may be over-segmented or under-segmented by the initial detection methods.

Alternative methods of object segmentation is boundary based method (C. C. Leung, W. F. Chen2, P. C. K. Kwok, and F. H. Y. Chan, Brain Tumor Boundary Detection in MR Image with Generalized Fuzzy Operator, IEEE International Conference on Image Processing, September 2003.) which could yield accurate object boundary but often have gaps between the edges and cannot completely define an object region, problem in object connectivity. The inaccurate object segmentation yields incorrect measurements on the segmented objects (Pascal Bamford, EMPIRICAL COMPARISON OF CELL SEGMENTATION ALGORITHMS USING AN ANNOTATED DATASET, IEEE International Conference on Image Processing, September 2003). Any analysis and conclusion drawn based on the incorrect measurements will be erroneous and compromised.

OBJECTS AND ADVANTAGES

This invention overcomes the prior art problems of boundary inaccuracy in the region based segmentation method and the problem of object connectivity in the edge based segmentation method. It uses the initial detection of object regions as the baseline for boundary refinement. This method takes advantage of the good object connectivity of the region based segmentation method while takes advantage of the fine boundary definition of the edge based segmentation method.

It uses the transitional properties near the initially detected regions of the object boundaries for fine boundary detection using a plurality of one dimensional boundary detection processing and integration. The one dimensional directional transitional property detection allows multiple directional detection of object boundaries. This increases the detection sensitivity and lower the false detection since the direction of transition is taken into account for the transitional property detection. The detection sensitivity is further improved since detection from multiple directions is performed. The detection is performed around the area of likely object boundaries. This further reduces the risk of false boundary detection. The detected borders are connected, grown and ambiguous boundaries are backtracked. This is followed by region guided boundary completion to assure the object connectivity.

The primary objective of the invention is to provide object segmentation results with good object connectivity and object boundary accuracy. The second objective of the invention is to provide an accurate object segmentation mask for object feature measurements. Another objective of the invention is to provide a general purpose method to refine objects from the initial object detection region detected from any initial object segmentation method. A fourth objective of the invention is to provide a fast processing method to object segmentation since simple initial detection may be sufficient and the refinement only have to handle points near the borders rather than the whole images. A fifth objective of the invention is to provide a better object connectivity from the initial regions of interest by breaking falsely connected objects. A sixth objective of the invention is to provide a better object boundary definition from the edge based segmentation by filling the gaps between broken edges. A seventh objective of the invention is to provide highly accurate object segmentation masks for biological objects such as live cell phase contrast images.

SUMMARY OF THE INVENTION

A region-guided boundary refinement method for object segmentation in digital images receives an initial object regions of interest and performs directional boundary decomposition using the initial object regions of interest to generate a plurality of directional object boundaries output. A directional border search is performed using the plurality of directional object boundaries to generate base border points output. A base border integration is performed using the base border points to generate base borders output. In addition, a boundary completion is performed using the base borders having boundary refined object regions of interest output.

A region-guided boundary completion method for object segmentation in digital images receives an initial object regions of interest and base borders. It performs boundary completion using the initial object regions of interest and the base borders to generate boundary refined object regions of interest output. The boundary completion method performs border growing using the base borders to generate grown borders output. A region guided connection is performed using the grown borders to generate connected borders output. A region guided merging is performed using the connected borders to generate fined object regions of interest output.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which:

FIG. 3A illustrates an example octagon region;

FIG. 3B illustrates the boundary of the octagon region;

FIG. 3C shows the left boundary of the octagon region;

FIG. 3D shows the right boundary of the octagon region;

FIG. 3E shows the top boundary of the octagon region;

FIG. 3F shows the bottom boundary of the octagon region;

FIG. 8A illustrates another example intensity profile of a cell in phase contract image: J;

FIG. 8B illustrates directional dilation: J⊕B;

FIG. 8C illustrates directional dilation residue: J⊕B−J;

DETAILED DESCRIPTION OF THE INVENTION

I. Application Scenario

Figure 1:
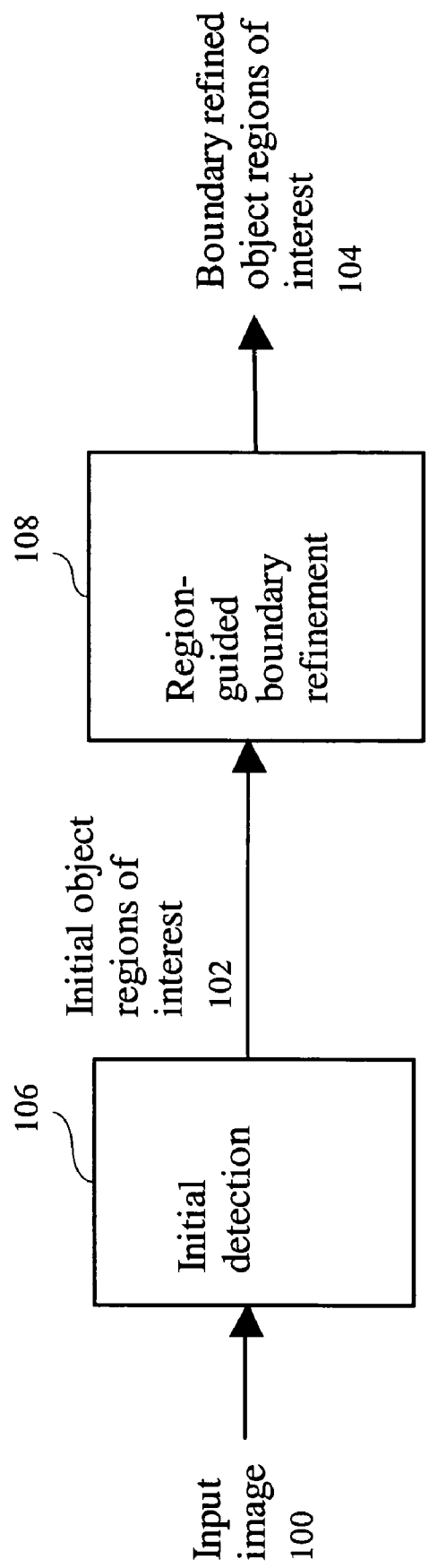
FIG. 1 shows the processing flow for the region-guided boundary refinement application scenario.

The application scenario of the region-guided boundary refinement method of this invention includes two steps. The processing flow of the application scenario of the region-guided boundary refinement method is shown in FIG. 1. The first step, initial detection 106, detects the initial object regions of interest 102. The second step, region-guided boundary refinement 108, performs objects of interest boundary refinement using the initial object regions of interest 102 as the basis. This results in boundary refined object regions of interest 104.

As shown in FIG. 1, the input image 100 is processed by the initial detection step 106 for initial object regions of interest 102 segmentation. In one embodiment of the invention, a threshold method is applied to some image characteristics for the initial detection. The threshold could be a global one that is either fixed or dynamically determined from the histogram of the image characteristics. The threshold could also be a local one where the values are different for different pixel locations.

In another embodiment of the invention, a more sophisticated object segmentation method disclosed in "Lee, Shih-Jong, U.S. Pat. No. 5,867,610, Method for identifying objects using data processing techniques" can be used for initial detection. In yet another embodiment of the invention, another object segmentation method disclosed in "Lee, Shih-Jong, Oh, Seho, U.S. patent application Ser. No. 10/410,063, Learnable Object Segmentation", which is incorporated in its entirety herein, is used for initial detection. The detailed embodiment of the region-guided boundary refinement 108 of the current invention is described in the next section.

II. Region-guided Boundary Refinement

Figure 2:
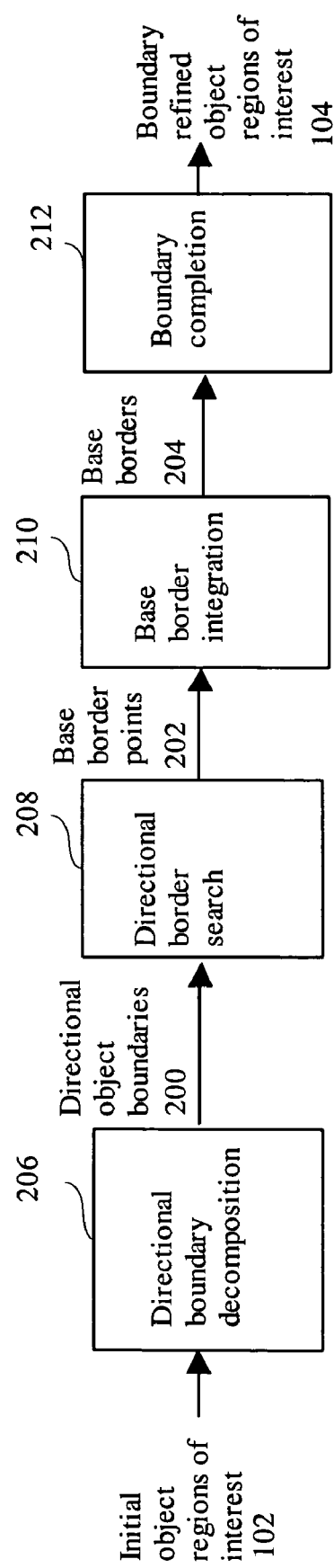
FIG. 2 shows the overall processing flow for the region-guided boundary refinement method.

The region-guided boundary refinement 108 of the current invention performs objects of interest boundary refinement using the initial object regions of interest 102 as the basis. This results in boundary refined object regions of interest 104. In one embodiment of the invention, the overall processing flow for the region-guided boundary refinement method is shown in FIG. 2. The initial object regions of interest 102 are processed by a base border detection method. The base border detection method consists of a directional boundary decomposition step 206, a directional border search step 208 and a base border integration step 210. The directional boundary decomposition 206 uses the initial object regions of interest 102 to generate a plurality of boundary segments from a pre-selected number of directions of the objects, the directional object boundaries output 200. The directional object boundaries 200 are processed by a directional border search step 208 that searches the directional border points along the predefined directions. This results in base border points 202 from each direction. The base border points 202 are candidates object boundaries. They are processed by the base border integration step 210 that integrates the base border points 202 from a plurality of directions. This results in base borders output 204. The base borders 204 are processed by a boundary completion step 212 to refine and connect all borders of an object. This results in boundary refined object regions of interest 104 output. Note that not all steps of the region-guided boundary refinement are needed for an application. The need to include the steps depends on the complexity of the applications.

II.1 Directional Boundary Decomposition

The directional boundary decomposition 206 step inputs the initial object regions of interest 102 and decomposes the boundaries of the object regions of interest 102 into a plurality of the directional object boundaries 200. FIG. 3A to FIG. 3F show an illustrative example of the directional object boundaries. FIG. 3A shows an example octagon region, 300. FIG. 3B shows the boundary of the octagon region, 302. FIG. 3C shows the left boundary of the octagon region 304. FIG. 3D shows the right boundary of the octagon region, 306. FIG. 3E shows the top boundary of the octagon region 308 and FIG. 3F shows the bottom boundary of the octagon region 310. As can be seen from FIGS. 3A-3F, the union of the directional object boundaries 304, 306, 308, 310 is the boundary of the object region 302. However, the directional object boundaries do not have to be mutually exclusive. That is, the points in one directional object boundary can also be included in the points of other directional object boundaries. These cases exist in the diagonal boundaries of FIG. 3B.

Note that in this example, four directions are included in the decomposition: left, right, top, and bottom. Those skilled in the art should recognize that other directions such as diagonal directions could also be included. On the other hand, in some cases, fewer directions may be sufficient. In one embodiment of the invention, the boundary point could be extracted by shrunk the object region by one pixel in the desired direction and then subtract it from the original region. The shrinking could be performed using 2-point morphological erosion.

II.2 Directional Border Search

Figure 4:
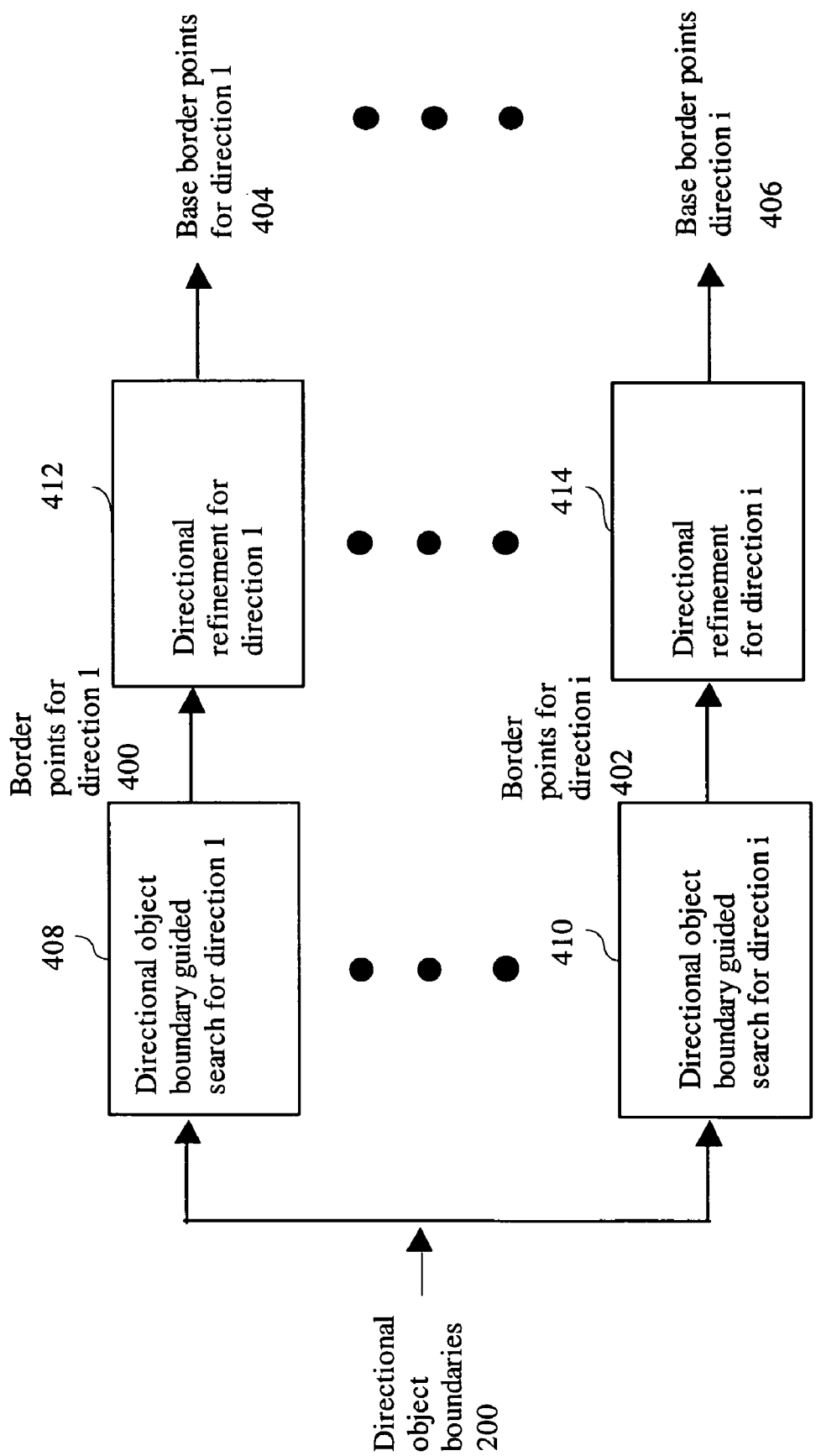
FIG. 4 shows the processing flow for the directional border search method.

The directional border search method uses the directional object boundaries 200 to guide the border point searches. The processing flow of the directional border search is shown in FIG. 4. As shown in FIG. 4, a plurality of directional object boundary guided searches 408, 410 are performed, each for each direction of the plurality of directional object boundaries 200. The border points for a direction 400, 402 is created from the directional object boundary guided search for the direction 408, 410. The border points for a direction 400, 402 are further processed by the directional refinement step for that direction 412, 414. This results in the base border points for the direction 404 or 406, etc.

II.2.1 Directional Object Boundary Guided Search

Figure 5:
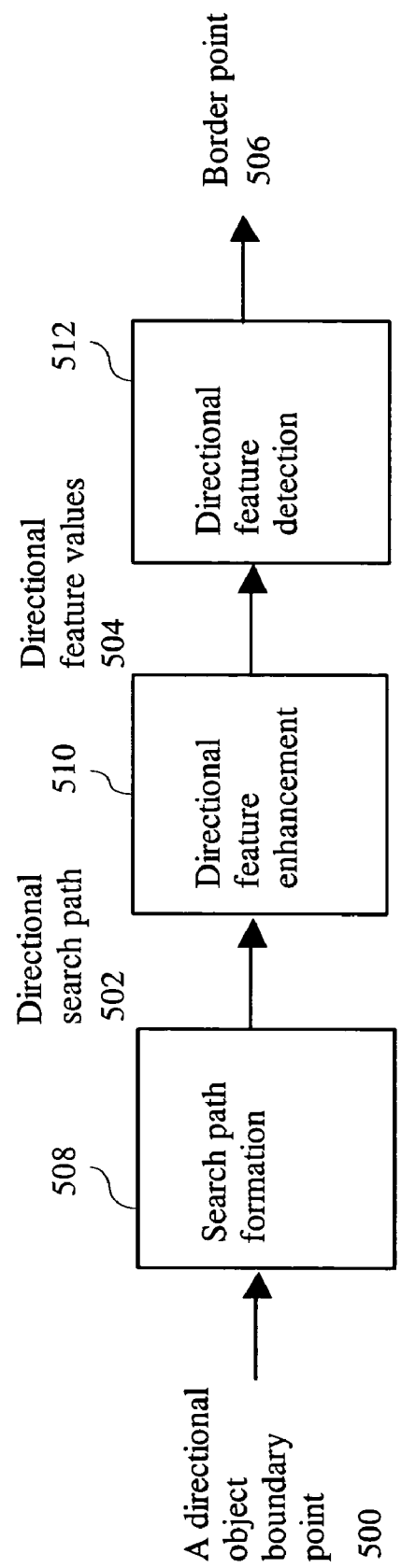
FIG. 5 shows the one dimensional feature point search method.

Given a direction, the directional object boundary guided search step processes all boundary points of the direction. Each point is processed by a one dimensional feature point search step to find the associated border position for the point. The one dimensional feature point search method consists of a search path formation step 508, a directional feature enhancement step 510, and a directional feature detection step as shown in FIG. 5. As shown in FIG. 5, a directional object boundary point 500 is processed by a search path formation step 508 to create a directional search path 502. The directional search path 502 is processed by a directional feature enhancement step 510 to enhance the feature of interest along the directional search path 502. This results in the directional feature values 504. The directional feature values 504 are sequentially processed by a directional feature detection step 512 to detect the border point 506. The border point 506 is a potential refinement point that could replace the directional object boundary point 500.

Search Path Formation

Figure 6:
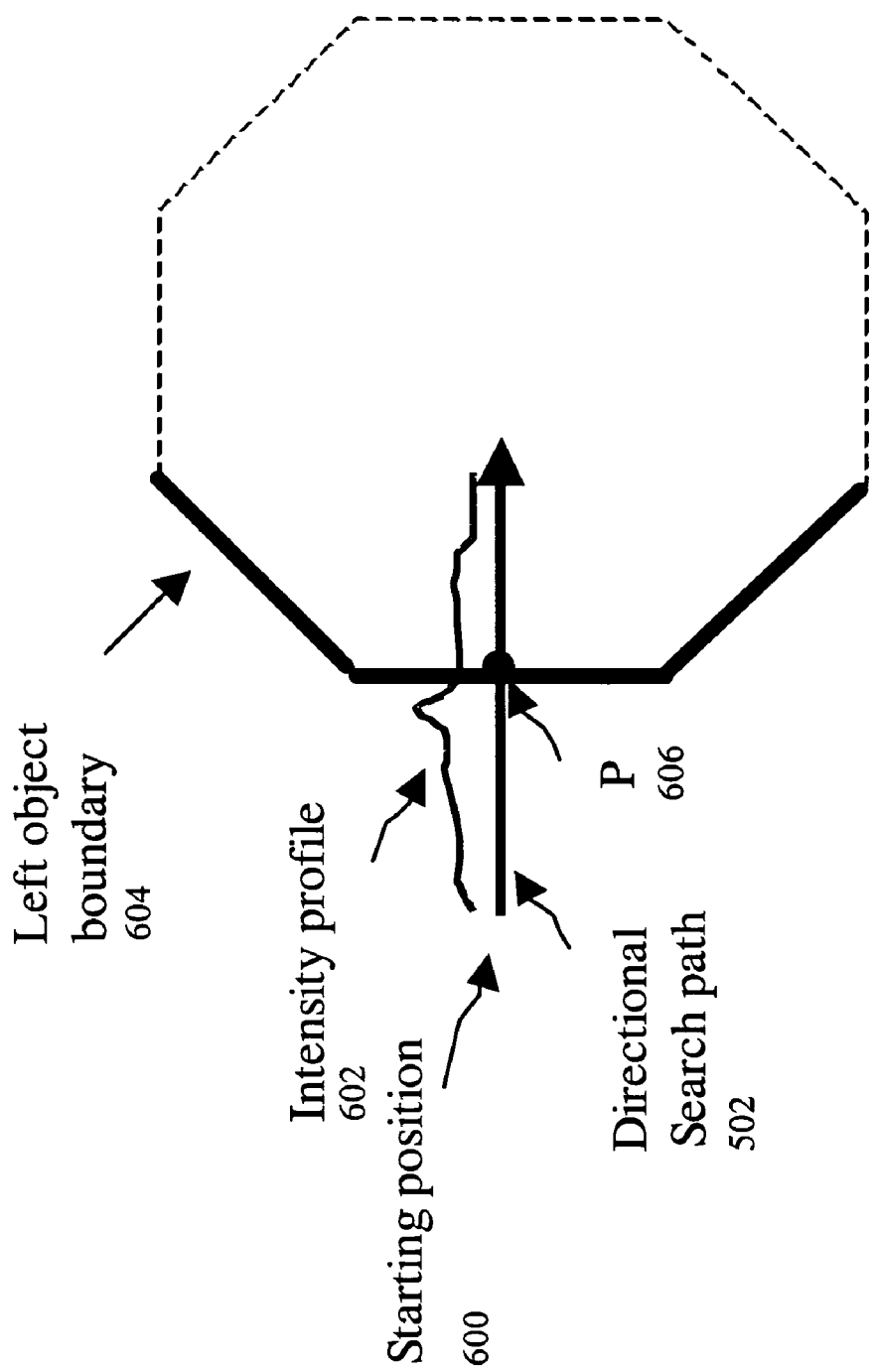
FIG. 6 illustrates a point P in a left object boundary and its search path.

Each point in a directional object boundary represents a location and a direction. In the search path formation step 508, a one dimensional search path can be uniquely defined for each point in each of the directional object boundaries. In one embodiment of the invention, the search path is a line passing through the given point and is oriented in the direction associated with the point. For example, the search paths are horizontal lines for the from left to the right directions and the search paths are vertical lines for the from top to the bottom directions. FIG. 6 illustrates a point P 606 in a left object boundary 604 and its directional search path 502, which is a horizontal line with a starting position 600 and search range determined by the search path formation step 508. The search is performed on the intensity profile 602 along the directional search path 502. The search path line direction can be easily determined from the direction associated with the directional object boundary. The search range can be a fixed value or can be determined as a function of the object size. In one embodiment of the invention, the starting position 600 of the directional search path 502 is defined so that the position of the object boundary point is at the half of the search range. The output of the search path formation step 508 is the directional search path 502 that contains the starting position 600, the direction and the search range.

Directional Feature Enhancement

Figure 7A:
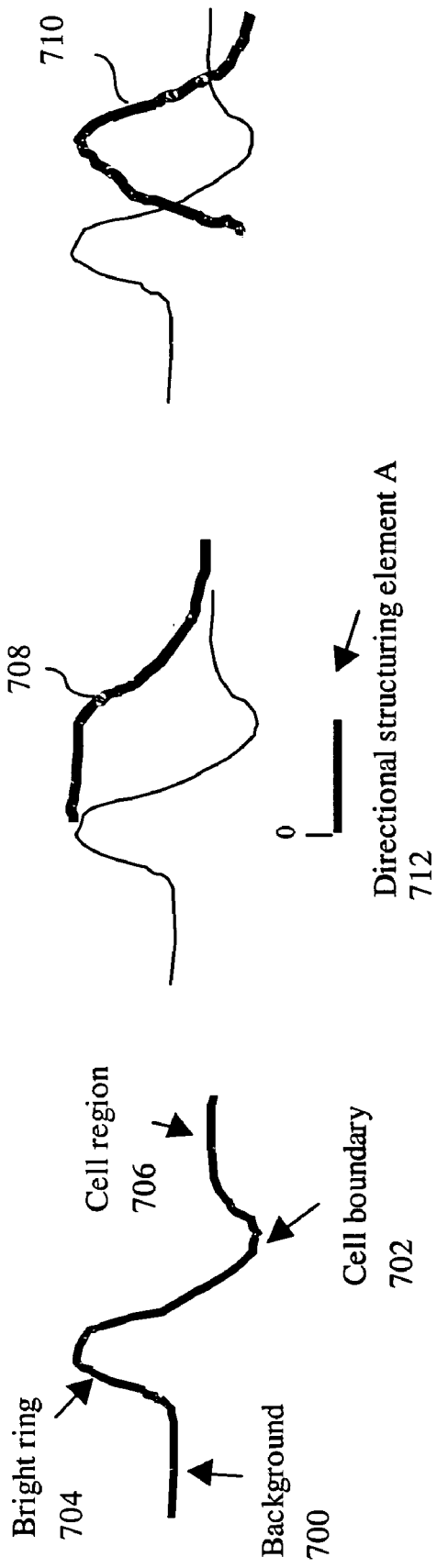
FIG. 7A illustrates example intensity profile of a cell in phase contract image: I.
Figure 7B:
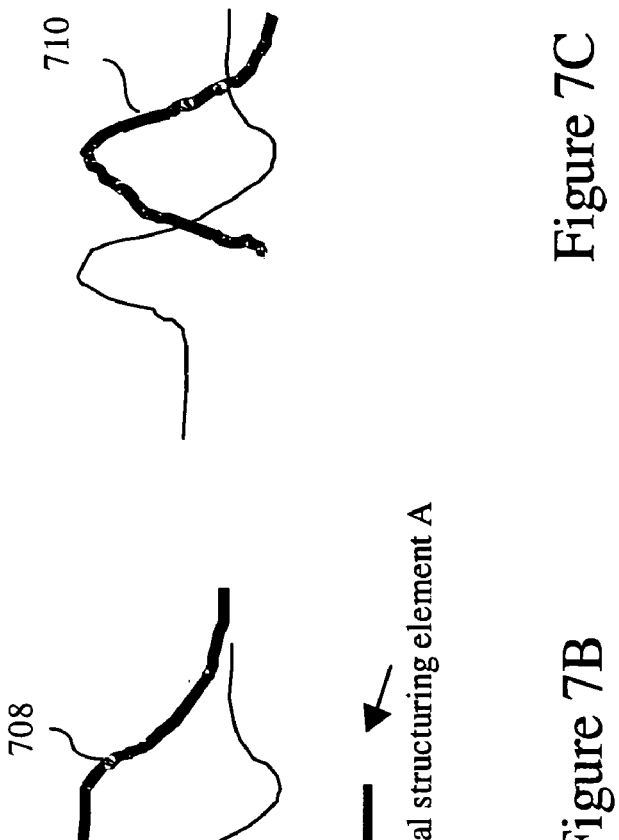
FIG. 7B illustrates directional dilation: I⊕A.
Figure 7C:
FIG. 7C illustrates directional dilation residue: I⊕A−I.

In the directional feature enhancement step, an image intensity profile 602 is created along the directional search path 502. In one embodiment of the invention, the image intensity profile 602 is simply the image intensity values at the positions along the directional search path 502. In another embodiment of the invention, the pixels near the directional search path 502 are projected into the path by intensity value averaging. The projection and averaging method reduces the effect of noise to the image intensity profile 602. The image intensity profile 602 is processed by one dimensional feature enhancement operations to enhance the features of interest. In one embodiment of the invention, a one-dimensional directional dilation residue is performed for feature enhancement. The dilation residue operation detects dark edge. Its processing sequence is defined as:

$$I \oplus A - I$$

Where $\oplus$ is the grayscale morphological dilation operation and A is the structuring element. The origin of a directional structuring element is not in the middle of the structuring element. It is shifted according to the desired direction. For example, if the direction is from left to right, the original is shifted to the rightmost point. The feature enhancement by the directional processing can be useful in detecting image of objects with directional characteristics. For example, in the phase contrast images of a biological cell, there is a brighter ring around the cell boundary and the cell is within darker region as illustrated in FIG. 7. FIG. 7A shows an example intensity profile of a cell in phase contrast image, I. The intensity profile includes background 700, bright ring 704, cell boundary 702, and cell region 706. FIG. 7B shows the directional dilation result 708 of I by a directional structuring element A 712 where the origin is located on the right of the structuring element 712. FIG. 7C shows the directional dilation residue result, $I \oplus A - I$, 710. Note that the location of cell boundary 702 has the highest feature value after the enhancement procedure. The advantage of the directional feature enhancement can further be illustrated by the example as sown in FIG. 8. FIG. 8A shows an example intensity profile of a cell in phase contract image, J. The intensity profile J is a mirror image of the intensity profile of I as can be seen from the positional relations between background 800, bright ring 804, cell boundary 802, and cell region 806. FIG. 8B shows the directional dilation result 808 of J by a directional structuring element B 812 where the origin is located on the left of the structuring element. FIG. 8C shows the directional dilation residue result, $J \oplus B - J$, 810. Note that the cell boundary has the highest feature value after the enhancement procedure even though the intensity profile J is different from the example of FIG. 7. Note that other directional feature enhancement methods such as linear filtering or the structure-guided processing method as disclosed in "Lee; Shih-Jong J., Structure-guided image processing and image feature enhancement, U.S. Pat. No. 6,463,175, Oct. 8, 2002" can be used.

Directional Feature Detection

The directional feature detection step 512 inputs the directional feature values 504 as results of the directional feature enhancement step 510. The directional feature detection step 512 checks the feature values 504 sequentially along the directional search path from the starting position toward the end of the directional search path following the given direction. The first point whose feature value is higher than a threshold is determined as the border point 506. It is important to note that the feature value of the detected border point may not be the maximum value among all values along the directional search path. It is the first occurrence that defines the border point 506. This underscores the unique directional property of the feature detection.

II.2.2 Directional Refinement for a Given Direction

Figure 9:
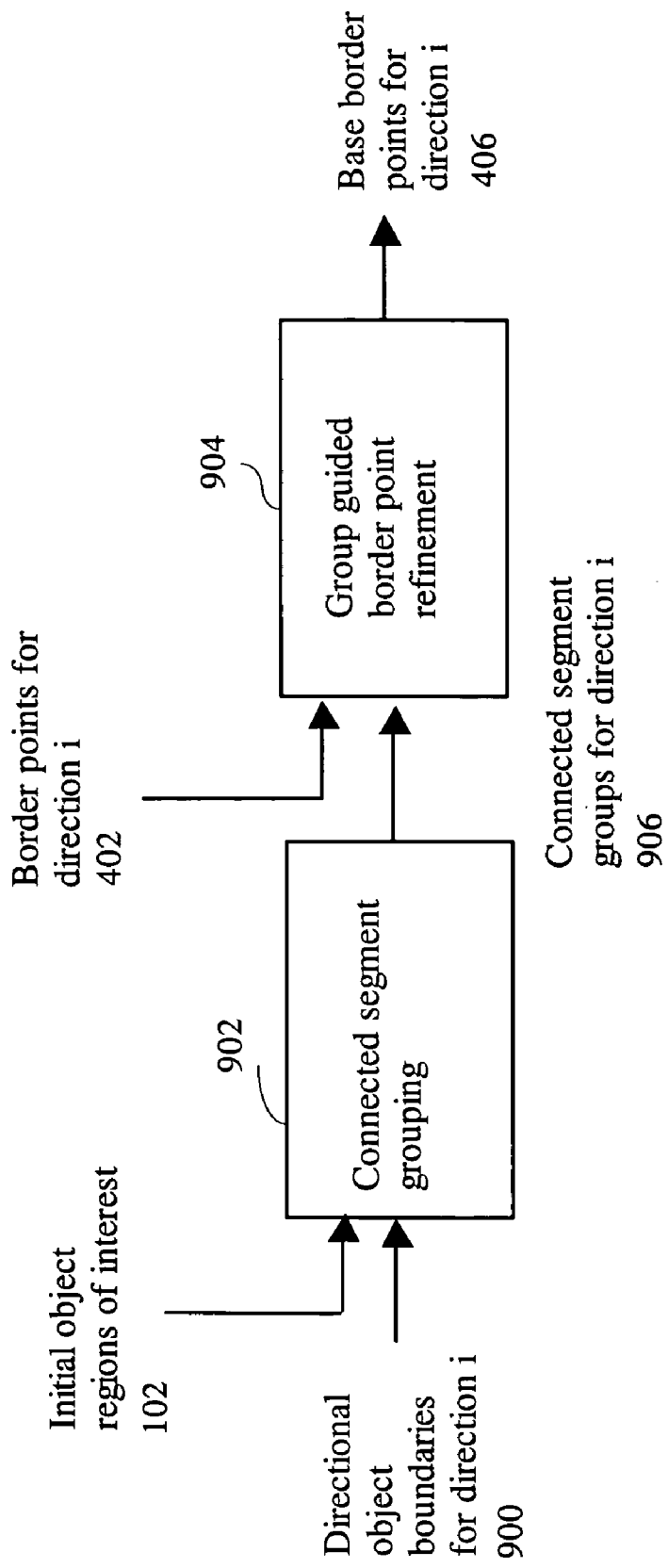
FIG. 9 shows the processing flow for the directional refinement method for a given direction i.

The border points for a given direction i is processed by the directional refinement step to generate the base border points for the direction i. The processing flow for the directional refinement method for a given direction i, 414, is shown in FIG. 9. The directional object boundary for direction i, 900, that is derived from the original region is used to guide the refinement process. The directional object boundary for direction i and the initial object regions of interest 102 are processed by a connected segment grouping step 902 to identify and group the connected segments of the directional object boundary. This results in connected segment groups for direction i output 906. Each of the connected segment groups for direction i is given an unique group ID. The group guided border point refinement step 904 inputs the connected segment groups for direction i 906 and the border points for direction i 402 and performs border point refinement by iterative filtering on the position profile of the border points within each of the connected segment groups. This results in base border points for direction i for the given direction i, 406.

Connected Segment Grouping

Figure 10:
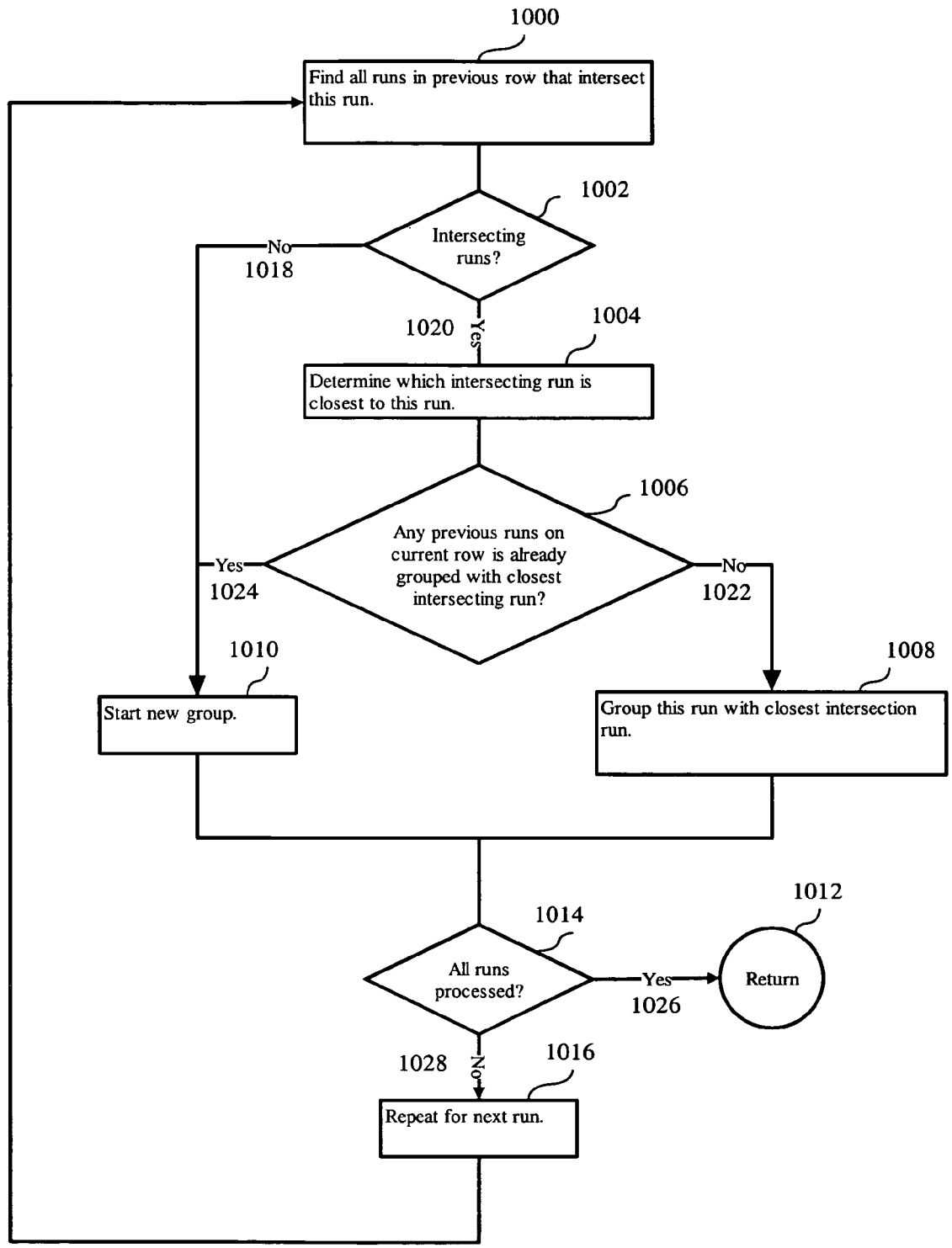
FIG. 10 shows the processing flow chart for the connected segment grouping method.

In one embodiment of the invention, the processing flow chart for the connected segment grouping method 902 is shown in FIG. 10. A run-length encoding is performed first with appropriate directions on the initial object region before the starting of the process as shown in the flow chart in FIG. 10. For the left and right directions, a regular row based run-length encoding scheme can be used. For the top and bottom directions, the initial object regions of interest are transposed first and then the regular row based run-length encoding is applied. After the run-length encoding, the flow chart of FIG. 10 is performed. The connected segment grouping operation 902 goes through each run sequentially, row by row. For a given run, it first finds all runs in the previous row that interest this run 1000, 1002. If interest occurs 1020, it determines the closest interesting run 1004 and check to see whether the closet intersection run is already grouped with another run in the current row 1006. If this is not the case 1022, the current run is grouped with the group associated with the closet intersection run 1008. In all other cases 1018, 1024, a new group is created 1010. This process is repeated 1028, 1016 until all runs are processed 1014, 1026, 1012. For the left object boundary, the starting point of the run is included in the grouping. For the right object boundary, the end point of the run is included in the grouping. Top or bottom object boundaries become left or right object boundaries after the region transposition. The resulting connected segment groups contain groups of connected segments, each with a unique ID.

Group Guided Border Point Refinement

Figures 11A, 11B, 11C:
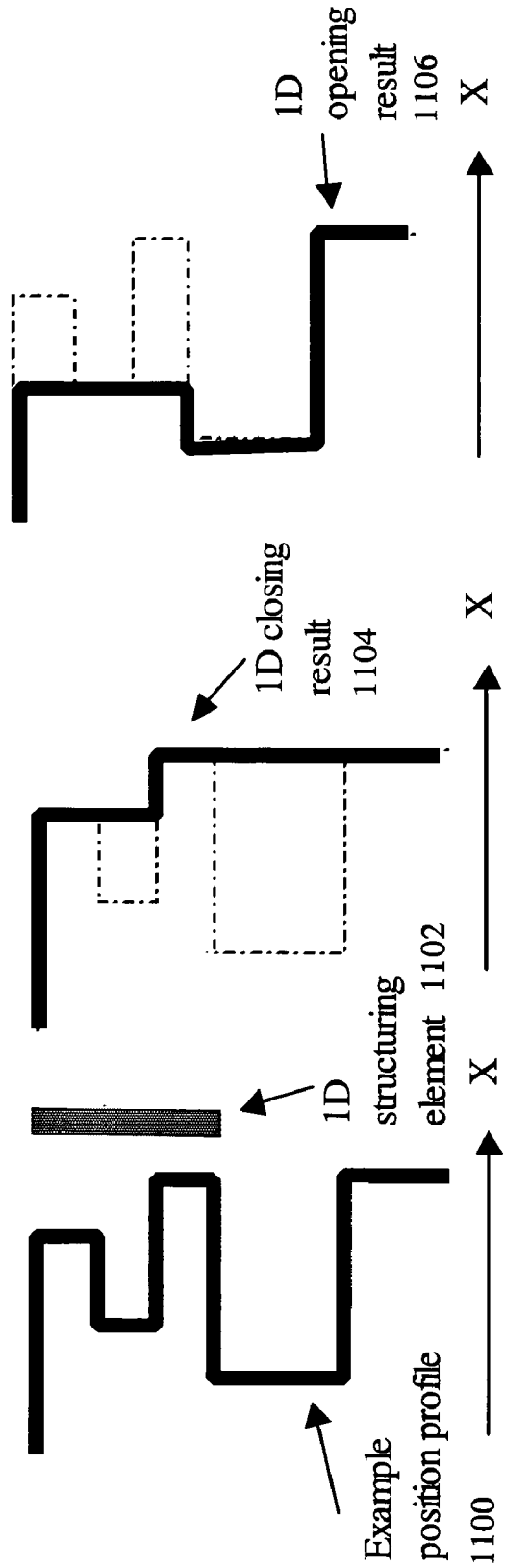
FIG. 11A illustrates an example positional profile for X direction and a 1D structuring element.
FIG. 11B shows the 1D closing result of the example positional profile.
FIG. 11C illustrates the 1D opening result of the example positional profile.

The group guided border point refinement method performs border point refinement by iterative filtering on the positional profile of the border points within each of the connected segment groups. In one embodiment of the invention, one dimensional (1D) morphological opening and closing operations with increasing sizes are iteratively applied to the X positions of the border points. FIG. 11A-FIG. 11C illustrate the 1D closing and opening operations. FIG. 11A shows an example positional profile 1100 for X direction and a 1D structuring element 1102. FIG. 11B shows the 1D closing result 1104 of the example positional profile and FIG. 11C shows the 1D opening result 1106 of the example positional profile. As can be seen from FIG. 11A-FIG. 11C, the 1D opening and closing on positional profile work just like regular 1D opening and closing except that the height is now the position of a point.

Figure 12:
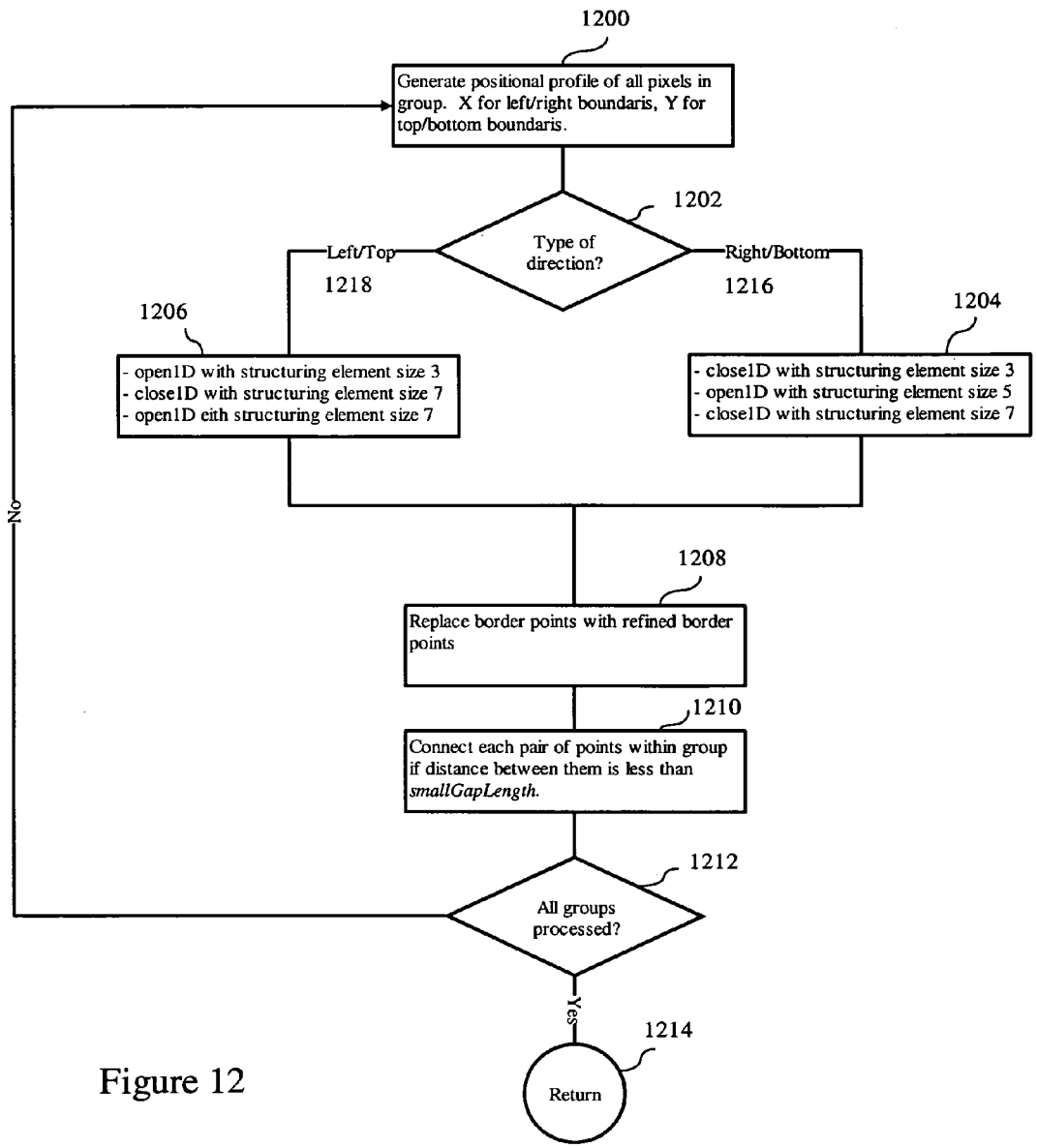
FIG. 12 shows the processing flow chart for the group guided border point refinement method.

The processing flow chart for the group guided border point refinement method 904 is shown in FIG. 12. As shown in FIG. 12, for a given segment group, its positional profile is created, 1200. The X positions are used for left or right boundaries and Y positions are used for top or bottom boundaries. Then the type of direction is determined 1202. For the left or top directions 1218, 1D opening of structuring element size 3 is performed. This is followed by a 1D closing of structuring element size 7, and then a 1D opening of structuring element size 7, 1206. For the right or bottom directions, 1216. 1D closing of structuring element size 3 is performed. This is followed by a 1D opening of structuring element size 7, and then a 1D closing of structuring element size 7, 1204. Those skilled in the art should recognize that other forms (closing, opening combination and sizes) of iterative filtering can be used and they are all within the scope of this invention.

The iterative filtering creates refined border points that are used to replace the un-refined border points 1208. In one embodiment of the invention, ad additional refinement step is performed to fill small gap. A smallGapLength is defined and a connection is made for two points within a group having distance between them that is less than the mallGapLength, 1210 The refinement process is repeated for all groups of the directional object boundary, 1212. This results in the base border points for the given direction, 1214.

II.3 Base Border Integration

The base border points 202 from the directional border search step 208 are candidates object boundaries. They are processed by the base border integration step 210 that integrates the base border points from a plurality of directions 404, 406. This results in base borders output 204. In one embodiment of the invention, the base border integration step 210 combines the base border points of all directions 404, 406, etc. by set union (or OR) operation. The combined result contains all border points that are included in at least one of the plurality of the directions. The combined results can be further conditioned by removing small connected segments of border points. This could be accomplished by checking the size of the connected segments of border points and excluding the ones whose size is smaller than a threshold. The results after combination and small segment removal are the base borders output 204.

II.4 Boundary Completion

The base borders 204 are processed by a boundary completion step 212 to refine and connect all borders of an object. This results in boundary refined object regions of interest output 104. The processing flow of the boundary completion step is shown in FIG. 13.

Figure 13:
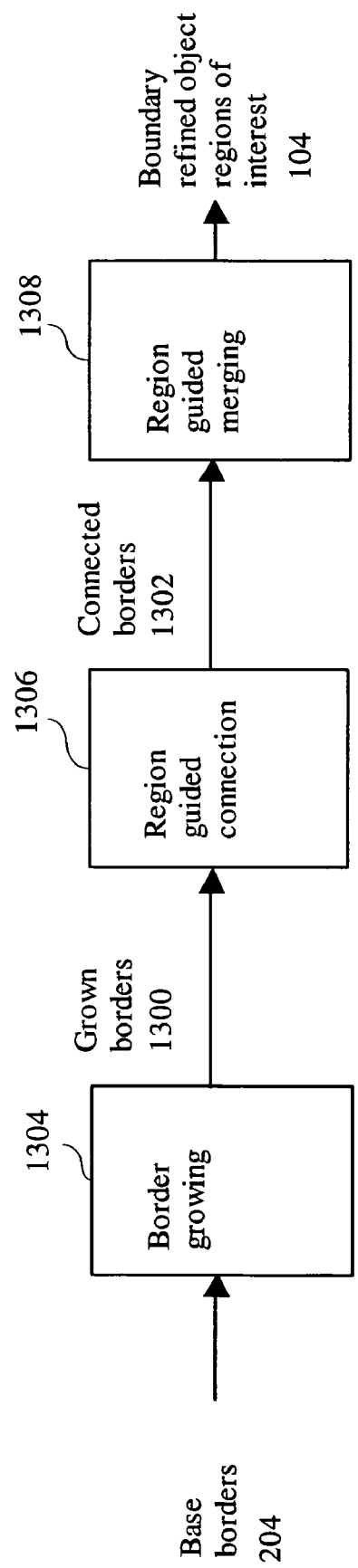
FIG. 13 shows the processing flow for the boundary completion method.

As shown in FIG. 13, the base borders 204 are processed by a border growing step 1304 that identifies seed endpoints in the base borders and grows the seed endpoints. This results in grown borders 1300. The grown borders 1300 may still have gaps. Therefore, a region guided connection step 1306 is performed on the grown borders 1300 to complete the regions and output connected borders 1302. However, there may be extra small regions formed by the connected borders 1302. Therefore, the connected borders 1302 are processed by a region guided merging step 1308 that merges the small regions to form boundary refined object regions of interest output 104.

II.4.1 Border Growing

The border growing step 1304 identifies seed endpoints 1402 in the base borders 204 and grows these seed endpoints 1402 to create grown borders 1300.

Figure 14:
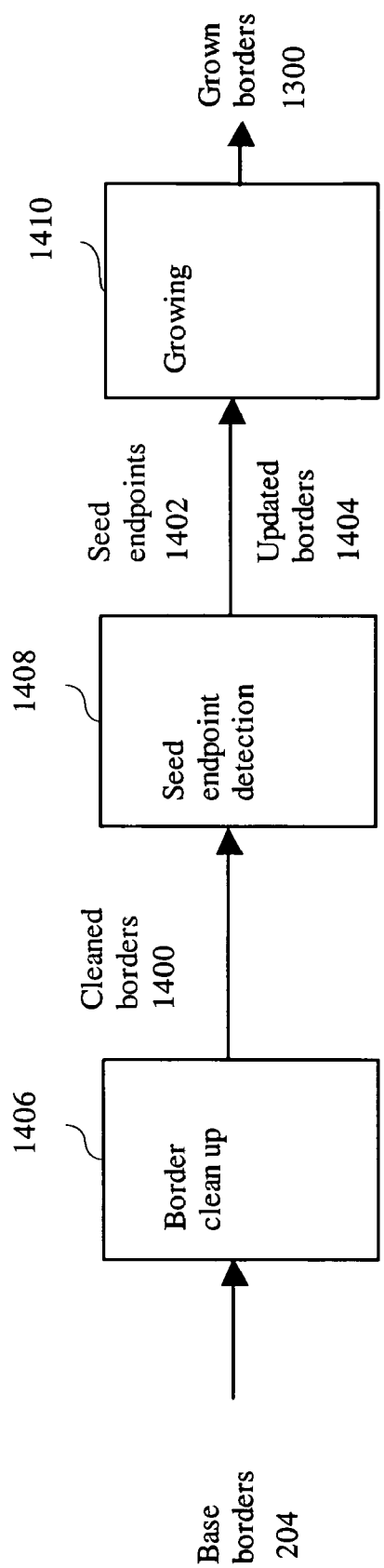
FIG. 14 shows the processing flow for the border growing method.

The processing flow of the border growing method is shown in FIG. 14. The base borders 204 are cleaned up first by a border clean up step 1406 to generate cleaned borders 1400 output. The cleaned borders 1400 are processed by a seed endpoint detection step 1408 that generates seed endpoints 1402 and updated borders 1404 for growing. The growing step 1410 grows the seed endpoints 1402 from the updated borders 1404 to generate the grown borders output 1300.

A. Border Clean Up

The border clean up step 1406 performs clean up of the base borders 204 to prepare for the seed endpoint detection step 1408. In one embodiment of the invention the cleaning step cosists of:
1. Removing corners, loops, double lines, etc, such that the border segments are only one pixel in width.
2. Removing short segments that branch off the main border and are not borders themselves.
3. Connect small gaps between the border segments.

In this embodiment of the invention, the structure-guided processing method "Lee, S J, "Structure-guided image processing and image feature enhancement" U.S. Pat. No. 6,463,175, Oct. 8, 2002" is used to identify and remove the corners, loops, double lines. Furthermore, connected component analysis is used to identify and remove short segments.

B. Seed Endpoint Detection

Figure 15:
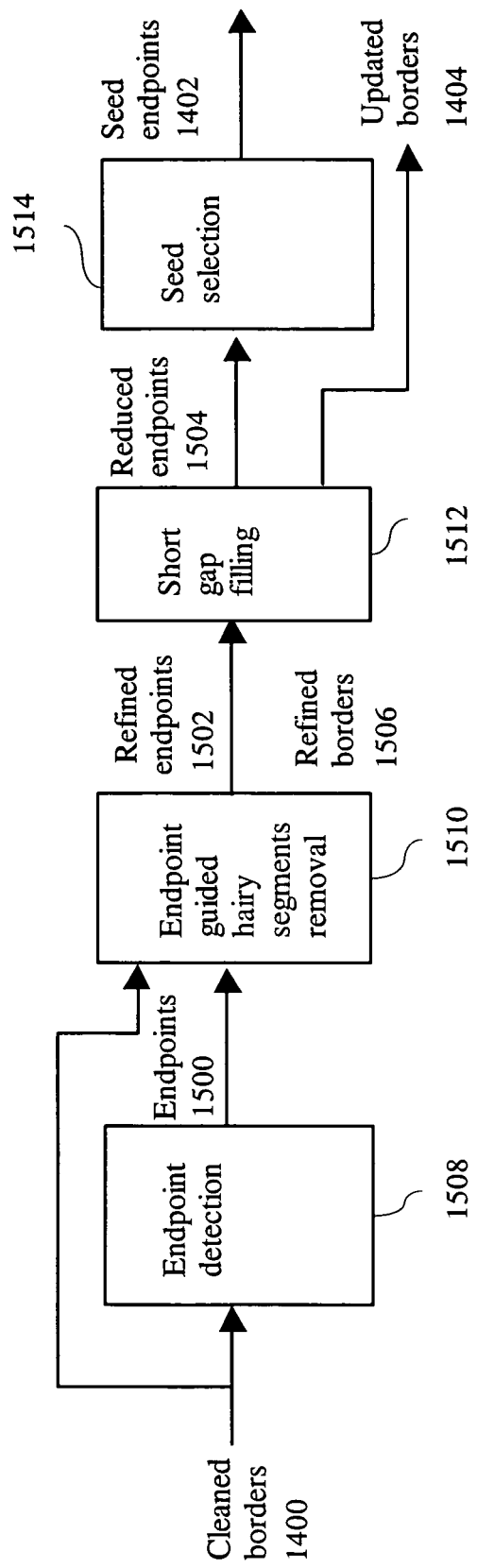
FIG. 15 shows the processing flow for the seed endpoint detection method.

The seed endpoint detection step 1408 detects all endpoints and then use the endpoints for back tracking to identify and remove "hairy" segments. It then fills the short gaps between endpoints and then selects the seeds from the remaining endpoints. The processing flow of the seed endpoint detection method is shown in FIG. 15. As shown in FIG. 15, the cleaned borders 1400 is processed by the endpoint detection step 1508. This step detects and outputs endpoints 1500. The endpoints and the cleaned borders 1400 are processed by an endpoint guided hairy segments removal step 1510. This step generates refined endpoints 1502 and refined borders 1506. The refined endpoints 1502 and refined borders 1506 are processed by a short gap filling step 1512. This step outputs reduced endpoints 1504 and updated borders 1404. The reduced endpoints 1504 is processed by s seed selection step 1514 to generate the seed endpoints 1402 output.

Endpoint Detection

An endpoint is a point with only one other point in its immediately adjacent 8 neighbors. Many methods could be used to detect endpoints. In one embodiment of the invention, each border point is given an intensity value B in the image and each non border point is assigned a zero value. The image is then processed by a 3 by 3 averaging filter. The pixels having original intensity of B and having the averaged value of 2/9*B are identified as the endpoints 1500 by the endpoint detection step 1508.

Endpoint Guided Hairy Segments Removal

In some applications, a subset of the endpoints 1500 could be associated with small hairy segments branched out of main borders. They are mainly caused by noise or image variations and should be removed. To remove the hairy segments, the length of the branch segment associated with each endpoint is determined.

In one embodiment of the invention, the length of the branch segment is measured by the following procedure:
Starting at endpoint, follow each pixel until the end is reached or until a pixel with more than one neighbor (in addition to the previous pixel) is encountered.
Record length (number of pixels).

The "hairy" segments are the ones ending up with more than one neighbor and the length is not long. The endpoint guided hairy segments removal step 1510 removes the "hair" segment from the cleaned borders 1400. This results in refined endpoints 1502 and refined borders 1506.

Short Gap Filling

Figure 16:
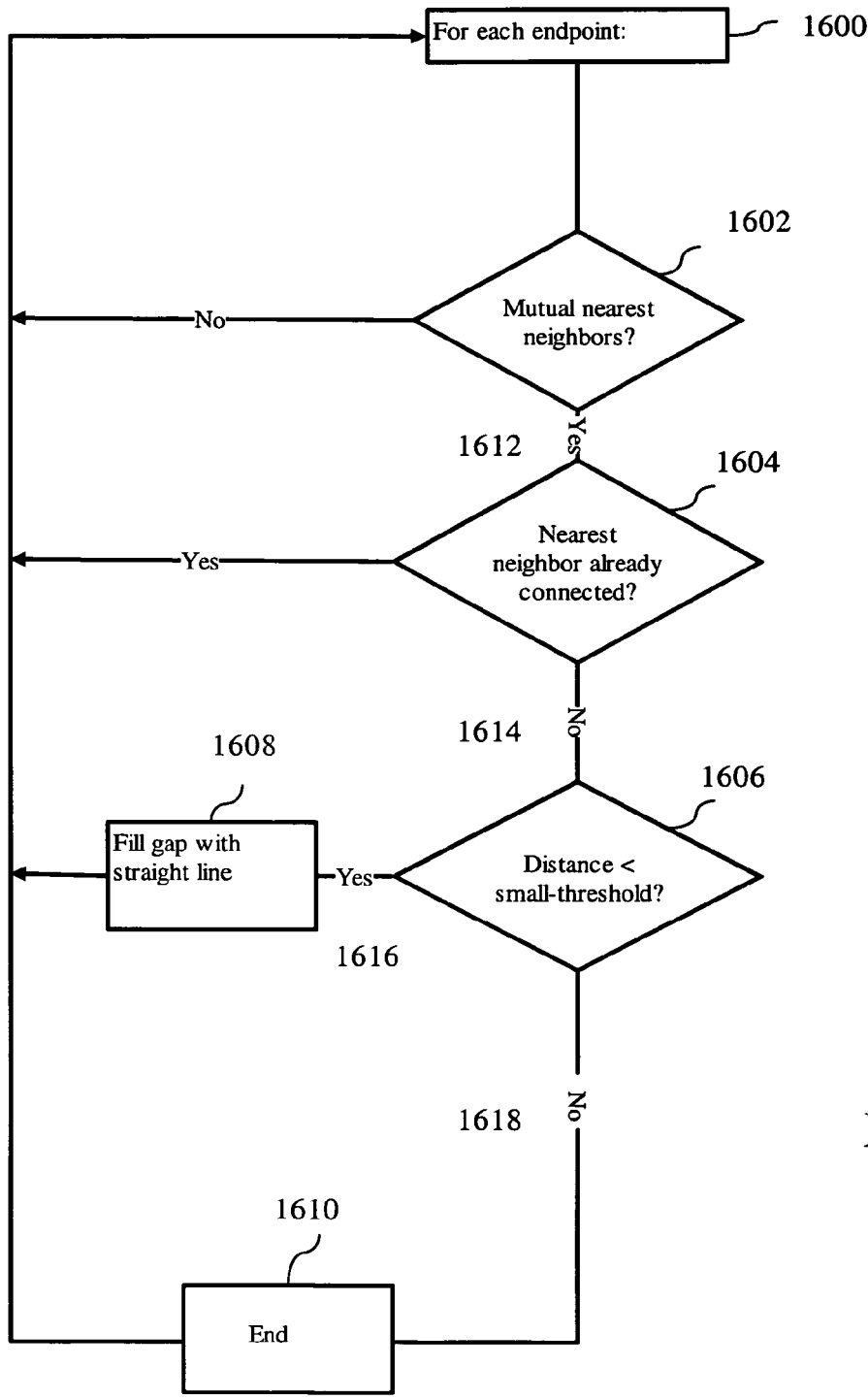
FIG. 16 shows the processing flow chart for the short gap filling method.

If the distance between two nearest endpoints is small, a short gap from the border exists. The short gaps are filled by the short gap filling step 1512. In one embodiment of the invention, the processing flow chart for the short gap filling method 1512 is shown in FIG. 16. For each endpoint 1600, it looks for a mutual nearest neighbor 1602. If this exists 1612, it will check whether the nearest neighbor is already connected by the sort gap filling of another endpoint 1604. If this is not the case 1614, it checks whether a short gap exist (Distance<small-threshold)? 1606 If a short gap exists 1616, it fills gap with a straight line 1608. This results in reduced endpoints 1504 and updated borders 1404. Otherwise 1618, it ends without filling gap 1618.

Seed Selection

In one embodiment of the invention, the seed selection process 1514 simply checks the length of the border segments associated with the reduced endpoints 1504. If an endpoint having long enough border segment, it is considered a seed endpoint 1402.

C. Growing

The growing step 1410 performs additional border point detection/growing for each of the seed endpoints 1402. In one embodiment of the invention, the processing flow of the growing method for a seed endpoint is shown in FIG. 17.

Figure 17:
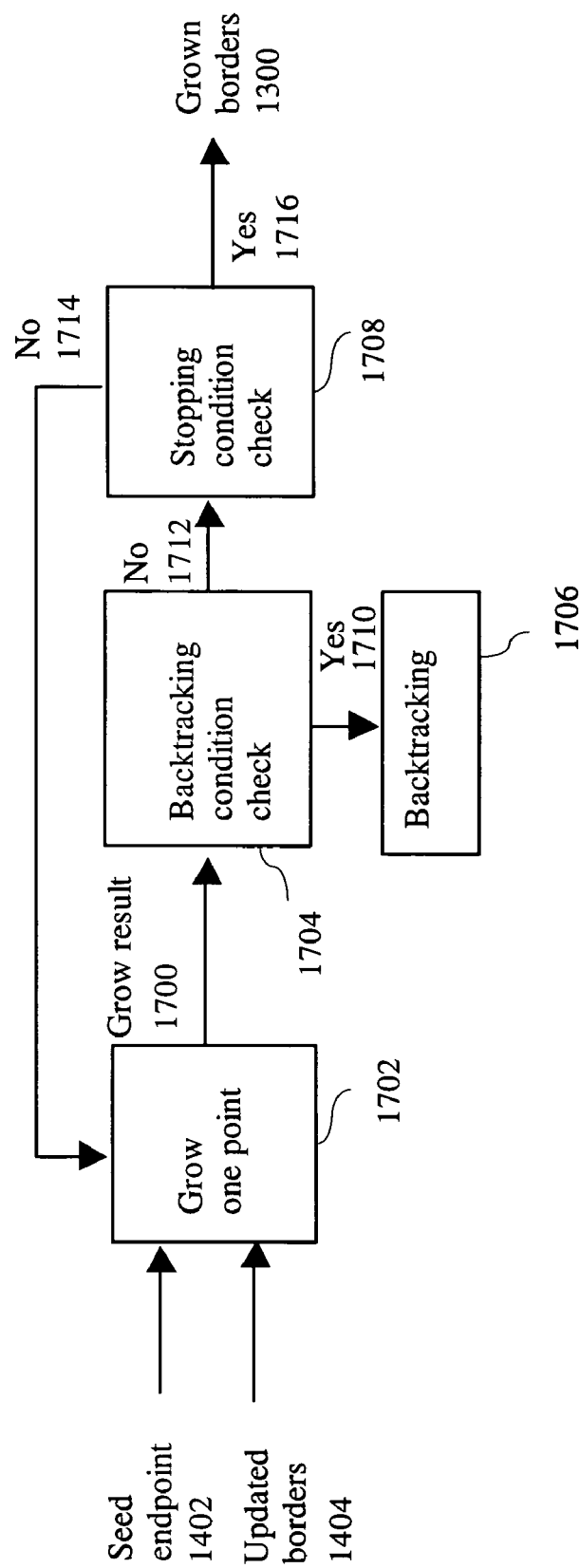
FIG. 17 shows the processing flow for the growing method for a seed endpoint.

As shown in FIG. 17, the growing process 1410 grows one point 1702 at a time starting with the seed endpoint 1402 and the updated borders 1404 to generate a grow result 1700. The grow result 1700 goes through a backtracking condition check step 1704. This step checks backtracking condition. If the backtracking condition is met 1710, the seed endpoint 1402 and its associated grow result 1700 are subjected to the backtracking process 1706. If the backtracking condition is not met 1712, it goes through a stopping condition check step 1708. If stopping condition is not met 1714, the grow one point step 1702 is repeated to continue grow new feature points associated with the same starting seed endpoint 1402. If the stopping condition is met 1716, the growing of the seed endpoint is completed and the grown border 1300 is outputted for this seed endpoint 1402.

Grow One Point

In one embodiment of the invention, the grow one point process 1702 consists of the following steps:
1. Perform directional feature enhancement and feature detection in a plurality of forward directions consistent with the current growing direction;
2. If the no feature points are detected, mark as missing point;
3. Else if at least one feature point is detected, pick the detected feature location closest to current location;
4. If the picked feature location is not adjacent to the current location, mark as a jump and increments a jump count by 1.

The grow result 1700 consists of either the new feature location or the missing status. It also provides the jump count, which is initiated at 0 before the growing of a seed endpoint 1402.

Figure 18:
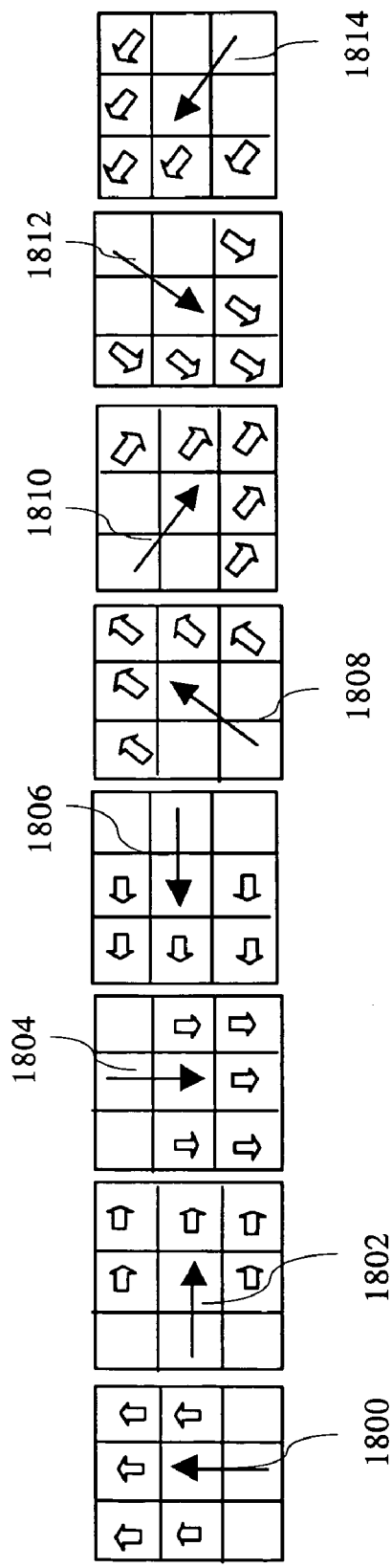
FIG. 18 illustrates the forward directions for different growing directions.

FIG. 18 shows the forward directions for different growing directions. There are 5 forward directions (shown in ⇨) for each of the eight growing directions 1800, 1802, 1804, 1806, 1808, 1810, 1812, 1814 (shown in →).

Backtracking Condition Check

The backtracking condition is checked 1704 during each iteration. In one embodiment of the invention, the backtracking condition selects from a set consisting of:
1. Multiple, consecutive jumps,
2. Feature location creates looping.

If the grow result matches either one of the above conditions, backtracking 1706 will take place.

Stopping Condition Check

The stopping condition is checked 1708 during each iteration. In one embodiment of the invention, the stopping condition selects from a set consisting of:
1. Missing point condition exist,
2. Growing feature location comes close to or intersects an existing border,
3. the length of the growing for a seed endpoint exceeds a maximum length.

If the grow result matches either one of the above conditions, the grow stops. Otherwise, the grow one point process 1702 is repeated.

Backtracking

The backtracking step 1706 checks the consistency between intensity characteristics for a growing point and its preceding points along the same border.

In one embodiment of the invention, the coefficient of variations contrast between two sides of a feature point is calculated as the intensity characteristics for checking. The coefficient of variation (cov) for the pixels from each side of a feature point is calculated as Cov=standard deviation of intensity/mean of intensity The coefficient of variation contrast is calculated as $Cov\_1-Cov\_2$ Where $Cov\_1$ is the Cov value of side one and $Cov\_2$ is the Cov value of side two.

Those skilled in the art should recognize that other intensity characteristics could be used for the consistency check. They are all within the scope of this invention.

In one embodiment of the invention, the backtracking process starts from the seed endpoint. It checks the next grow feature points by comparing the difference between the average coefficient of variation contrast of the preceding points and the coefficient of variation contrast of the new point. It stops the grow at the point where a plurality of consecutive large difference exist. The stop growing point is the backtracked points.

II.4.2 Region Guided Connection

The grown borders 1300 from the border growing step 1304 may still have gaps. Therefore, a region guided connection step 1306 is performed on the grown borders 1300 to complete the regions. The region guided connection step 1306 connects qualified seed points to an existing border location in an attempt to achieve good region connectivity.

The initial object regions of interest 102 do not have gaps in their region boundary since the regions are well defined. Therefore, they could be used to guide the connection of grown borders 1300.

II.4.2.1 Qualified Endpoint Based Region Guided Connection

Figure 19:
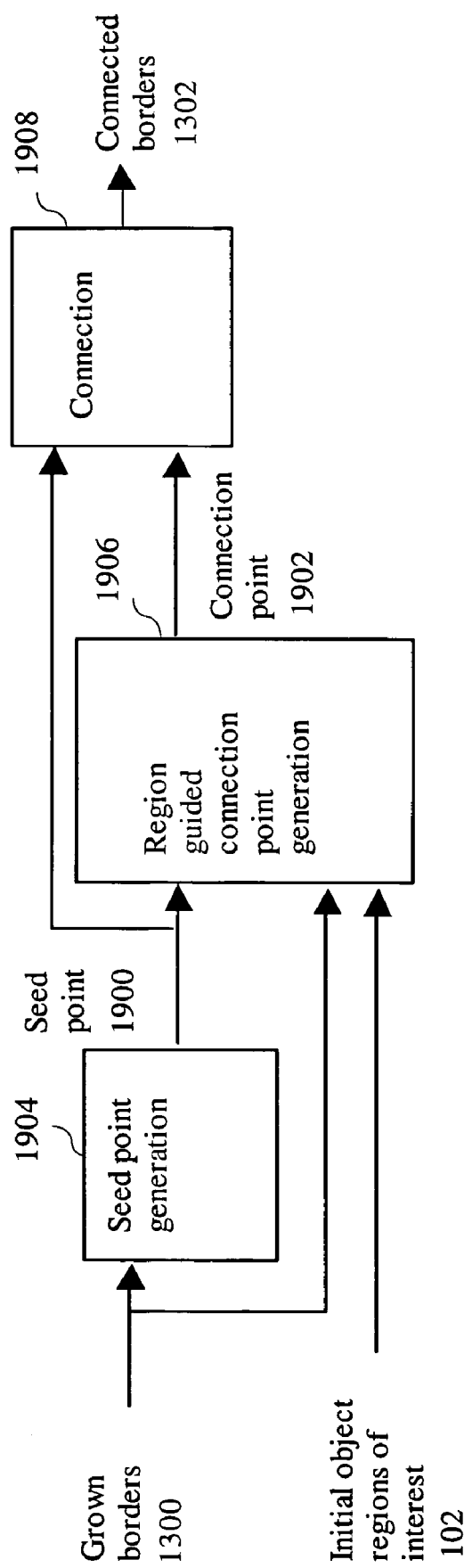
FIG. 19 shows the processing flow for the region guided connection method.

In one embodiment of the invention, qualified endpoints are used as seed points and the processing flow of the region guided connection method is shown in FIG. 19. As shown in FIG. 19, the grown borders 1300 are processed by a seed point generation step 1904 to generate seed point(s) 1900. The seed point(s) 1900, the grown borders 1300, and the initial object regions of interest 102 are processed by a region-guided connection point generation method 1906 to generate connection point(s) 1902. The connection point(s) 1902 and the seed point(s) 1900 are used by a connection step 1908 to connect the seed point(s) 1900 and the connection point(s) 1902. This results in connected borders 1302 output.

A. Seed Point Generation

The seed point generation step 1904 finds the endpoints of the grown borders 1300 and qualify them for connection. In one embodiment of the invention, the endpoint detection method 1508 as described in II.4.1.B is used for finding the endpoints. To avoid exceeding connection on already well connected regions, the border component associated with an endpoint is checked. If the border component forms closed region(s), the total size of the region(s) will be checked. If the size exceeds a limit, the region needs no further connection. In this case, the endpoint is not selected as a seed point. Otherwise, the endpoint is included as a seed point 1900.

B. Region-guided Connection Point Generation

Figure 20:
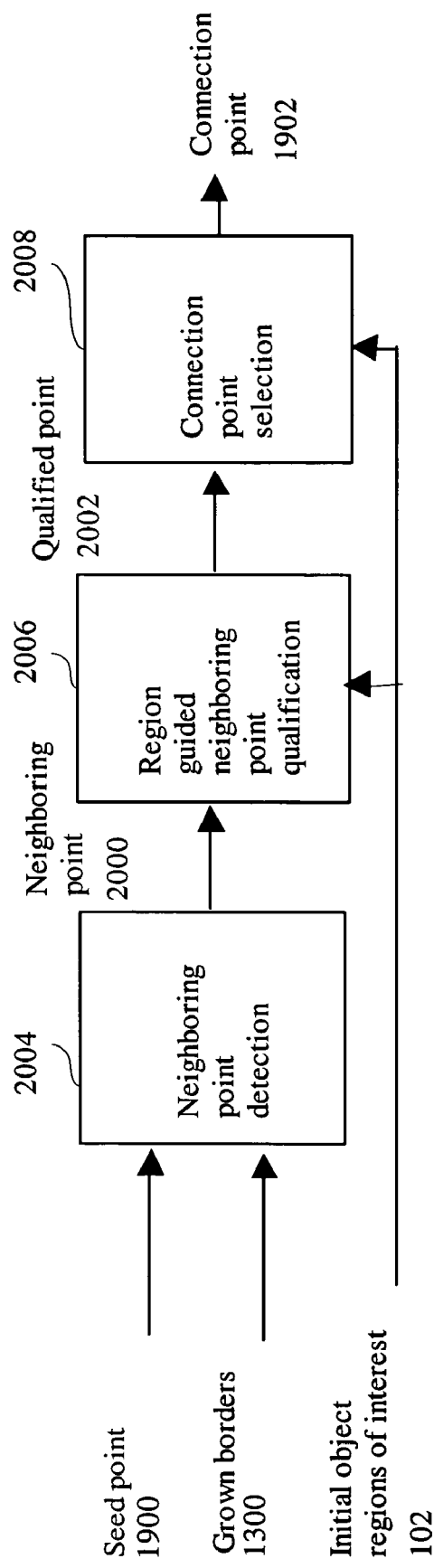
FIG. 20 shows the processing flow for the region guided connection point generation method.

To connect a seed point, its corresponding connection point is identified by the region guided connection point generation step 1906. In one embodiment of the invention, the processing flow of the region-guided connection point generation method 1906 is shown in FIG. 20. The seed point 1900 and the grown borders 1300 are used by the neighboring point detection 2004 to generate neighboring point(s) 2000. In one embodiment of the invention, a neighboring point 2000 is a point in the grown borders 1300 that is within a given distance from the seed point 1900.

The region guided neighboring point qualification step 2006 qualifies the neighboring point 2000 using the initial object regions of interest 102 to qualify the neighboring point 2000. This results in qualified point 2002. The qualified point 2002 is processed by a connection point selection step 2008 to generate connection point 1902.

Crossing Region Qualification Check

In one embodiment of the invention, a crossing region qualification check is applied for the region guided neighboring point qualification 2006. The crossing region qualification check generates the zone of influence (ZOI) boundaries using the initial object regions of interest 102. It disqualifies a neighboring point 2000 if the line connecting the seed point 1900 and the neighboring point 2000 intersects with a ZOI boundary.

The ZOI partitions the image into multiple mutually exclusive regions. The pixels within a ZOI region are either inside its associated initial object region of interest or are closer to the region boundary than any other region boundaries. Therefore, the zone of influence boundaries are the boundaries dividing the regions in the ZOI. The description of ZOI is detailed in Shih-Jong J. Lee, Tuan Phan, Method for Adaptive Image Region Partition and Morphologic Processing, U.S. patent application Ser. No. 10/767,530, 26 Jan. 04, which is incorporated herein in its entirety.

Intra-border Distance Qualification Check

In another embodiment of the invention, an intra-border distance qualification check is applied for the region guided neighboring point qualification 2006. The neighboring points 2000 of a seed point 1900 may include points from the same border connected component. Those neighboring points from the same border connected component have to be qualified to avoid the ones that will form small loop when connecting with the seed point 1900. In one embodiment of this invention, the distance transform is applied to the border connected component pixels by assigning the initial distance label of the seed point 1900 to zero and assigning all other pixels except the border connected component pixels a large number. After the distance transform, the distance of the border connected component pixels to the seed point is determined, the intra-border distance. The intra-border distance qualification check disqualifies a neighboring point if it is from the same border connected component yet its intra-border distance value is lower than a limit. The limit could be a pre-defined value or could be dynamically determined as a fraction of the maximum intra-border distance value of the border connected component.

The distance transform is disclosed in Shih-Jong J. Lee, Tuan Phan, Method for Adaptive Image Region Partition and Morphologic Processing, U.S. patent application Ser. No. 10/767,530, 26 Jan. 2004, which is incorporated herein in its entirety.

Connection Point Selection

In one embodiment of the invention, the qualified point 2002 with the shortest distance to the seed point 1900 is selected as the connection point 1902. In another embodiment of the invention, the qualified point 2002 at the direction that is consistent with the border segment around the seed point 1900 is selected. In a third embodiment of the invention, the shortest qualified point within the direction that is consistent with the border segment around the seed point 1900 is selected.

In an alternative embodiment of the invention, the distance metric is changed to include the initial region of interest boundary into consideration. This is accomplished by weighting the original distance by a region boundary alignment weighting factor. In one embodiment of the invention, the distance transform of the initial region of interest boundary is performed, region boundary distance. The region boundary distance value of a pixel indicates how far the pixel is from an initial region of interest boundary. The average region boundary distance values for all pixels in the line connecting between the seed point 1900 and a qualified point 2002 can be determined as a weighting factor for the qualified point 2002. The weighting factor can be applied to the original distance metric to create a new region boundary guided distance metric. In this alternative embodiment of the invention, the region boundary guided distance metric is used for the connection point selection 2008 process to generate connection point 1902.

C. Connection

The connection process extends the border by connecting a line between the seed point and the connection point.

II.4.2.2 Intersection Region Guided Connection

In another embodiment of the invention, intersection region guided connection method is used for the region guided connection 1306. The processing flow of the intersection region guided connection method is shown in FIG. 21.

Figure 21:
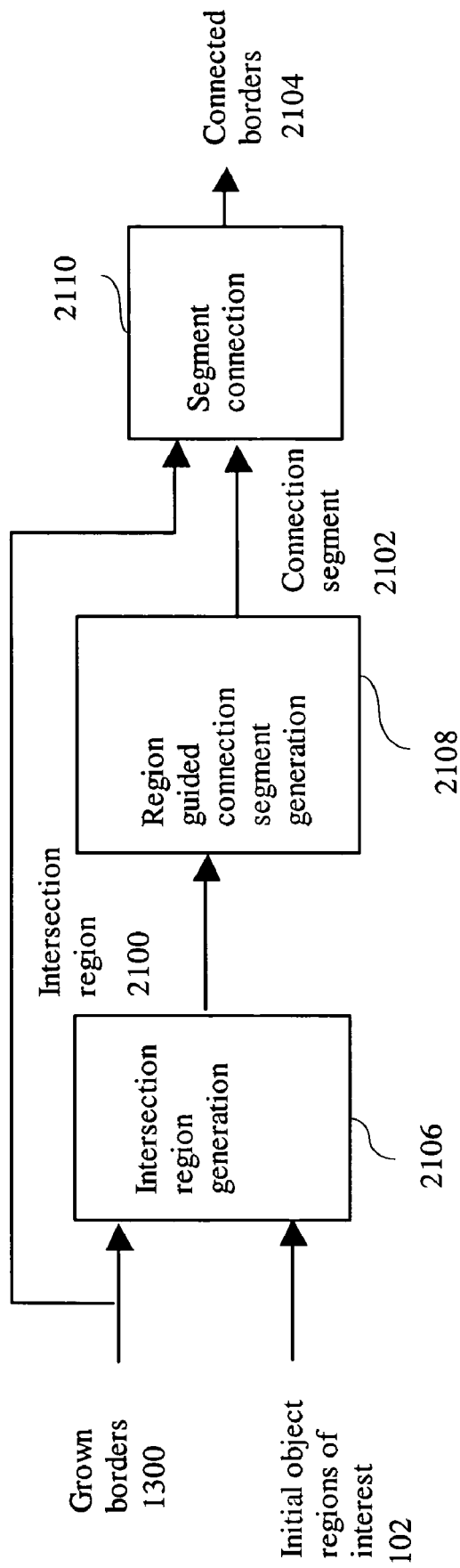
FIG. 21 shows the processing flow for the intersection region guided connection method.

As shown in FIG. 21, the grown borders 1300 and the initial object regions of interest 102 are processed by an intersection region generation step 2106. The step uses the grown borders 1300 to further divide the initial object regions of interest 102. This process creates intersection region(s) 2100. The intersection region(s) 2100 are processed by a region-guided connection segment generation process 2108 that removes the boundaries of small intersection regions. The remaining initial object regions of interest boundary segment that intersects the grown borders 1300 in both ends are the candidate connection segments. The candidate segments that are within a length limit are selected as connection segment(s) 2102. The connection segment(s) 2102 are processed by the segment connection 2110 step that OR (set union) the connection segment(s) 2102 with the grown borders 1300 to form the connected border 2104 output.

II.4.3 Region Guided Merging

The region guided merging step 1308 that merges the small regions to form boundary refined object regions of interest 104 output. It inputs the connected borders 1302 and performs connected component analysis on the regions formed by the connected borders 1302. It then identifies small regions by region size threshold. In one embodiment of the invention, a small region is merged into an adjacent region if the adjacent region and the small region both include pixels of the same region in the initial object regions of interest 102. The region size check and merge process is repeated for the newly formed regions until no more region merge is possible.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A region-guided boundary refinement method for object segmentation in digital images comprising the steps of:
    a) Input initial object regions of interest;
    b) Perform directional boundary decomposition using the initial object regions of interest having a plurality of directional object boundaries output;
    c) Perform directional border search using the plurality of directional object boundaries having base border points output;
    d) Perform base border integration using the base border points having base borders output.

2. The region-guided boundary refinement method of claim 1 further performs boundary completion using the base borders having boundary refined object regions of interest output.

3. The region-guided boundary refinement method of claim 1 wherein the directional border search method further consists of a plurality of the following steps:
    a) Perform directional object boundary guided search using the directional object boundaries having border points for the direction output;
    b) Perform directional refinement for the direction using the border points for the direction having base border points for the direction output.

4. The directional border search method of claim 3 wherein the directional object boundary guided search method performs one dimensional feature point search for each point of the directional object boundaries.

5. The directional object boundary guided search method of claim 4 wherein the one dimensional feature point search method consists of the following steps:
    a) Perform search path formation using a directional object boundary point having directional search path output;
    b) Perform directional feature enhancement using the directional search path having directional feature values output;
    c) Perform directional feature detection using the directional feature values having a border point output.

6. The directional border search method of claim 3 wherein the directional refinement method consists of the following steps:
    a) Perform connected segment grouping using the directional object boundaries and initial object regions of interest having connected segment groups for the direction output;
    b) Perform group guided border point refinement using the border points for the direction and the connected segment groups for the direction having base border points for the direction output.

7. The boundary completion method of claim 2 further consists of the following steps:

a) Perform border growing using the base borders having grown borders output;
b) Perform region guided connection using the grown borders having connected borders output;
c) Perform region guided merging using the connected borders having boundary refined object regions of interest output.

8. The boundary completion method of claim 7 wherein the border growing method consists of the following steps:
a) Perform border clean up using the base borders having cleaned borders output;
b) Perform seed endpoint detection using the cleaned borders having seed endpoints and updated borders output;
c) Perform growing using the seed endpoints and updated borders having grown borders output.

9. The border growing method of claim 8 wherein the seed endpoint detection method consists of the following steps:
a) Perform endpoint detection using the cleaned borders having endpoints output;
b) Perform endpoint guided hairy segments removal using the cleaned borders and endpoints having refined endpoints and refined borders output;
c) Perform short gap filling using refined endpoints and refined borders having reduced endpoints and updated borders output;
d) Perform seed selection using reduced endpoints having seed endpoints output.

10. The border growing method of claim 8 wherein the growing method consists of the following steps:
a) Perform grow one point using the seed endpoints and updated borders having grow result output;
b) Perform backtracking condition check using the grow result having yes or no output;
c) Perform stopping condition check having yes or no output.

11. The boundary completion method of claim 7 wherein the region guided connection method consists of the following steps:
a) Perform seed point generation using the grown borders having seed point output;
b) Perform region guided connection point generation using the seed point, the grown borders and the initial object regions of interest having connection point output;
c) Perform connection using the seed point and connection point having connected borders output.

12. The region guided connection method of claim 11 wherein the region guided connection point generation method consists of the following steps:
a) Perform neighboring point detection using the seed point and the grown borders having neighboring point output;
b) Perform region guided neighboring point qualification using the neighboring point and the initial object regions of interest having qualified point output;
c) Perform connection point selection using the qualified point and the initial object regions of interest having connection point output.

13. The boundary completion method of claim 7 wherein the region guided connection method consists of the following steps:
a) Perform intersection region generation using the grown borders and the initial object regions of interest having intersection region output;
b) Perform region guided connection segment generation using the intersection region having connection segment output;
c) Perform segment connection using the grown borders and connection segment having connected borders output.

14. A region-guided boundary refinement method for object segmentation in digital images comprising the steps of:
a) Input initial object regions of interest;
b) Perform base border detection using the initial object regions of interest having base borders output;
c) Perform boundary completion using the base borders having boundary refined object regions of interest output.

15. The region-guided boundary refinement method of claim 14 wherein the base border detection method further consists of the following steps:
a) Perform directional boundary decomposition using the initial object regions of interest having a plurality of directional object boundaries output;
b) Perform directional border search using the plurality of directional object boundaries having base border points output;
c) Perform base border integration using the base border points having base borders output.

16. The base border detection method of claim 15 wherein the directional border search method further consists of a plurality of the following steps:
a) Perform directional object boundary guided search using the directional object boundaries having border points for the direction output;
b) Perform directional refinement for the direction using the border points for the direction having base border points for the direction output.

17. The region-guided boundary refinement method of claim 14 wherein the boundary completion method further consists of the following steps:
a) Perform border growing using the base borders having grown borders output;
b) Perform region guided connection using the grown borders having connected borders output;
c) Perform region guided merging using the connected borders having boundary refined object regions of interest output.

18. The boundary completion method of claim 17 wherein the border growing method consists of the following steps:
a) Perform border clean up using the base borders having cleaned borders output;
b) Perform seed endpoint detection using the cleaned borders having seed endpoints and updated borders output;
c) Perform growing using the seed endpoints and updated borders having grown borders output.

19. A region-guided boundary completion method for object segmentation in digital images comprising the steps of:
a) Input initial object regions of interest;
b) Input base borders;
c) Perform boundary completion using the initial object regions of interest and the base borders having boundary refined object regions of interest output.

20. The region-guided boundary completion method of claim 19 wherein the boundary completion method further consists of the following steps:
a) Perform border growing using the base borders having grown borders output;
b) Perform region guided connection using the grown borders having connected borders output;
c) Perform region guided merging using the connected borders having boundary refined object regions of interest output.

21. The boundary completion method of claim 20 wherein the border growing method consists of the following steps:
   a) Perform border clean up using the base borders having cleaned borders output;
   b) Perform seed endpoint detection using the cleaned borders having seed endpoints and updated borders output;
   c) Perform growing using the seed endpoints and updated borders having grown borders output.

22. The border growing method of claim 21 wherein the seed endpoint detection method consists of the following steps:
   a) Perform endpoint detection using the cleaned borders having endpoints output;
   b) Perform endpoint guided hairy segments removal using the cleaned borders and endpoints having refined endpoints and refined borders output;
   c) Perform short gap filling using refined endpoints and refined borders having reduced endpoints and updated borders output;
   d) Perform seed selection using reduced endpoints having seed endpoints output.

23. The border growing method of claim 21 wherein the growing method consists of the following steps:
   a) Perform grow one point using the seed endpoints and updated borders having grow result output;
   b) Perform backtracking condition check using the grow result having yes or no output;
   c) Perform stopping condition check having yes or no output.

24. The boundary completion method of claim 20 wherein the region guided connection method consists of the following steps:
   a) Perform seed point generation using the grown borders having seed point output;
   b) Perform region guided connection point generation using the seed point, the grown borders and the initial object regions of interest having connection point output;
   c) Perform connection using the seed point and connection point having connected borders output.

25. The region guided connection method of claim 24 wherein the region guided connection point generation method consists of the following steps:
   a) Perform neighboring point detection using the seed point, the grown borders having neighboring point output;
   b) Perform region guided neighboring point qualification using the neighboring point and the initial object regions of interest having qualified point output;
   c) Perform connection point selection using the qualified point and the initial object regions of interest having connection point output.

26. The boundary completion method of claim 20 wherein the region guided connection method consists of the following steps:
   a) Perform intersection region generation using the grown borders and the initial object regions of interest having intersection region output;
   b) Perform region guided connection segment generation using the intersection region having connection segment output;
   c) Perform segment connection using the grown borders and connection segment having connected borders output.

* * * * *